United States Patent
Smith et al.

(10) Patent No.: US 11,569,927 B2
(45) Date of Patent: Jan. 31, 2023

(54) ALGORITHM AND TECHNIQUES FOR HIGH-RESOLUTION INTERFERENCE PARAMETER ESTIMATION IN LOW-SWAP ENVIRONMENT

(71) Applicant: L3Harris Technologies, Inc., Melbourne, FL (US)

(72) Inventors: Anthony D. Smith, Bluffdale, UT (US); L. Andrew Gibson, Riverton, UT (US); Joshua D. Christensen, Hooper, UT (US); Jeffrey L. Burgoyne, Bountiful, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 30 days.

(21) Appl. No.: 17/243,713

(22) Filed: Apr. 29, 2021

(65) Prior Publication Data
US 2022/0353006 A1    Nov. 3, 2022

(51) Int. Cl.
*H04K 3/00* (2006.01)

(52) U.S. Cl.
CPC ............. *H04K 3/224* (2013.01); *H04K 3/42* (2013.01); *H04K 3/43* (2013.01); *H04K 3/44* (2013.01); *H04K 3/86* (2013.01)

(58) Field of Classification Search
CPC ............ H04K 3/224; H04K 3/42; H04K 3/43; H04K 3/44; H04K 3/86
See application file for complete search history.

(56) References Cited

U.S. PATENT DOCUMENTS

| 6,903,674 B2* | 6/2005 | Hoesel ............... G01S 7/495 342/13 |
| 2002/0037061 A1 | 3/2002 | Learned |
| 2003/0146871 A1* | 8/2003 | Karr .................. G01S 5/021 342/465 |
| 2012/0058775 A1* | 3/2012 | Dupray ............. G01S 5/0257 455/456.1 |

FOREIGN PATENT DOCUMENTS

| WO | WO-9708849 A1 * | 3/1997 | ............ H04B 7/04 |
| WO | 2013/185150 A1 | 12/2013 | |
| WO | 2015/024056 A1 | 2/2015 | |

OTHER PUBLICATIONS

European Search Report received for EP Patent Application No. 22166095.4, dated Sep. 27, 2022, 9 pages.

* cited by examiner

*Primary Examiner* — John J Lee
(74) *Attorney, Agent, or Firm* — Workman Nydegger

(57) ABSTRACT

Techniques for providing a multi-stage iterative scheme to determine fine granularity estimates of parameters of an interfering signal and for using the fine granularity estimates of the parameters to reduce an impact of the interfering signal against a signal of interest (SOI) are disclosed. An input signal is identified. A first set of estimation parameters that provide a coarse granularity estimate of a center frequency of the jamming signal and of a symbol rate of the jamming signal are determined. The first set of estimation parameters are refined to generate a medium granularity estimate of the center frequency and the symbol rate of the jamming frequency. The medium granularity estimates are also refined to produce a fine granularity estimate of the center frequency and the symbol rate. The fine granularity estimates are used to remove or reduce an influence of the jamming signal on the input signal.

20 Claims, 25 Drawing Sheets

ALGORITHM AND TECHNIQUES FOR HIGH-RESOLUTION INTERFERENCE PARAMETER ESTIMATION IN LOW-SWAP ENVIRONMENT

BACKGROUND

Numerous different devices can be equipped with an antenna system for transmitting and/or receiving radio frequency ("RF") communications. These RF communications may be transmitted to, or received from, any number of different external targets, endpoints, wireless network nodes, or systems. As an example, RF communications can be sent and received by walkie-talkies, cell phones, vehicles, airplanes, rotary aircraft, ships, satellites, and so on.

RF communications have advanced significantly in recent years. Now, more than ever before, devices with RF capabilities are able to establish (in many cases even simultaneously) different RF communication links with external transmitters and receivers. Such advancements have substantially improved the quality of life. Because of the benefits provided by RF communications, more and more RF components (e.g., RF front-end components and RF back-end components) are being installed into electronic devices. With the proliferation of wireless RF communications, there is a substantial need to continuously improve such communications, especially in scenarios where signal interference may occur.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for providing a multi-stage iterative scheme to determine fine granularity estimates of parameters of an interfering signal and for using the fine granularity estimates of the parameters to reduce an impact of the interfering signal against a signal of interest (SOI). An input signal is identified. This input signal is suspected of being a jammed composite signal comprising a SOI and a jamming signal. A first set of estimation parameters are determined, where this first set provides a coarse granularity estimate of a center frequency of the jamming signal and of a symbol rate of the jamming signal. The embodiments refine the first set of estimation parameters to generate a second set of estimation parameters that provide a medium granularity estimate of the center frequency and the symbol rate of the jamming frequency. The medium granularity estimate of the center frequency and the symbol rate is relatively closer to actual values of the center frequency and the symbol rate than a relative closeness provided by the coarse granularity estimate of the center frequency and the symbol rate. The embodiments then refine the second set of estimation parameters to generate a third set of estimation parameters that provide a fine granularity estimate of the center frequency and the symbol rate of the jamming frequency. The fine granularity estimate of the center frequency and the symbol rate is relatively closer to the actual values of the center frequency and the symbol rate than a relative closeness provided by the medium granularity estimate of the center frequency and the symbol rate. After the third set of estimation parameters are generated, the third set of estimation parameters are used to remove or reduce an influence of the jamming signal on the input signal such that the SOI is identified.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
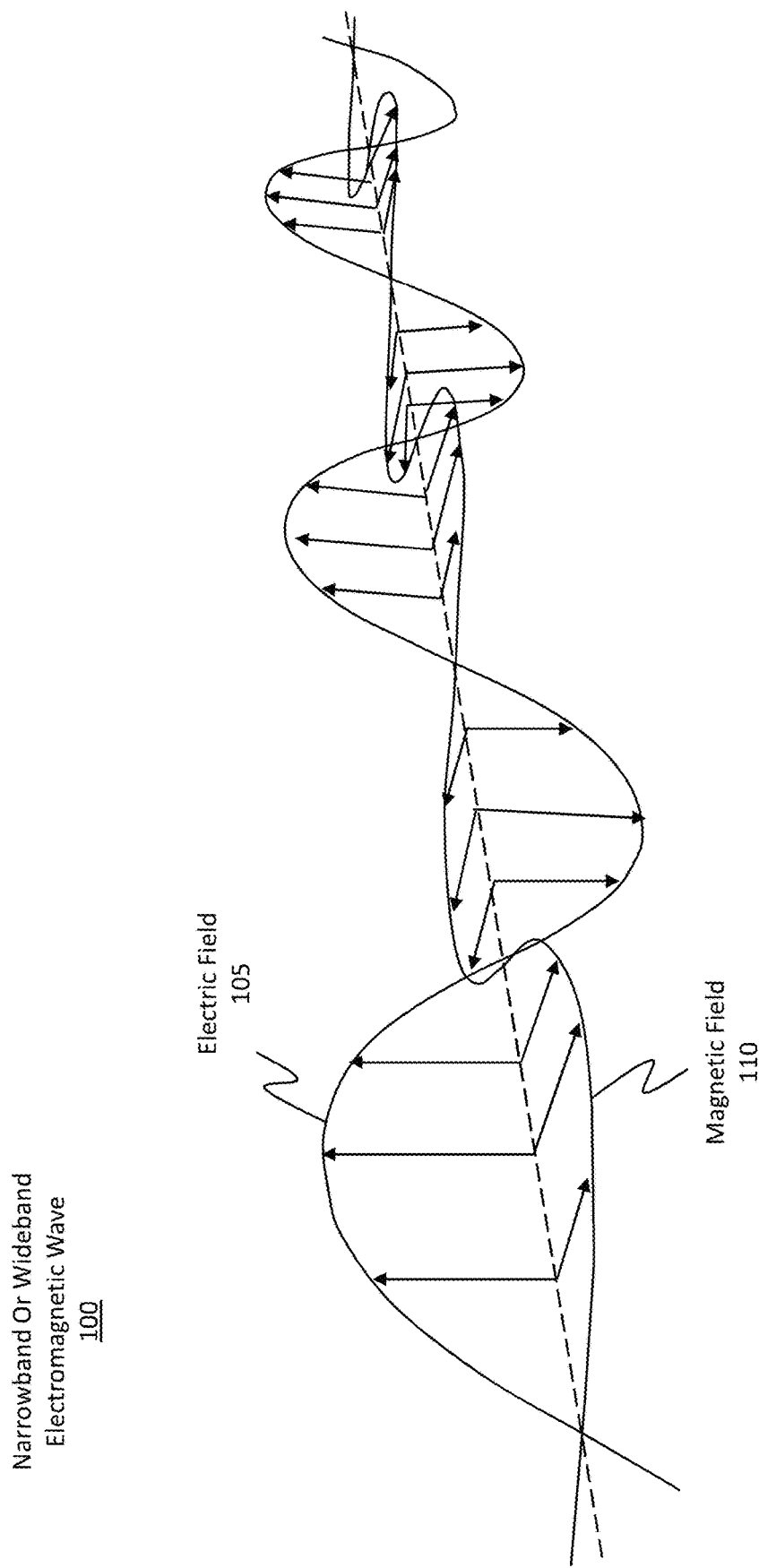
FIG. 1 illustrates an example of an electromagnetic wave that can be used to facilitate wireless communications between multiple devices.

Embodiments disclosed herein relate to systems, devices, and methods for providing a multi-stage iterative scheme to determine fine granularity estimates of parameters of an interfering signal and for using the fine granularity estimates of the parameters to reduce an impact of the interfering signal against a signal of interest (SOI).

In some embodiments, an input signal is identified. This input signal is suspected of being a jammed composite signal comprising a combination of a signal of interest (SOI) and a jamming signal. A first set of estimation parameters are determined, where this first set provides a coarse granularity estimate of a center frequency of the jamming signal and of a symbol rate of the jamming signal. The embodiments refine the first set of estimation parameters to generate a second set of estimation parameters that provide a medium granularity estimate of the center frequency and the symbol rate of the jamming frequency. The embodiments then refine the second set of estimation parameters to generate a third set of estimation parameters that provide a fine granularity estimate of the center frequency and the symbol rate of the jamming frequency. After the third set of estimation parameters are generated, the third set of estimation parameters are used to remove or reduce an influence of the jamming signal on the input signal such that the SOI is identified.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous real and practical improvements to the technical field. Generally, the disclosed embodiments use both inferred and learned information to uncover aspects of an interfering or jamming signal. That inferred information can then be used to improve both the detection and estimation of the parameters for that interfering signal. By determining the attributes of the interfering signal, the embodiments can then beneficially facilitate subsequent mitigation operations in an attempt to remove, eliminate, mitigate or at least reduce the impact of the interfering signal on a signal of interest (SOI). In this regard, the embodiments improve RF communications and improve how devices communicate with one another. In doing so, the embodiments also improve the efficiency of the electronic devices because retransmissions (e.g., which occur because of jamming) can be avoided as a result of providing an initially clear and coherent signal (e.g., by reducing the effects of the jamming signal).

The disclosed embodiments also beneficially input the spectra of a combination of interferers and signal-of-interests (SOI) to thereby minimize the effect of the jamming signals on the SOI signals using learned and inferred information about the SOI. The embodiments are also able to detect the largest interferers and to return approximate values for the interferer's symbol rates, center frequencies, and perhaps even relative powers. By performing the disclosed operations, the embodiments beneficially enable the identification and classification of interference signals. The embodiments also facilitate subsequent determinations of fine or granular estimation of the interference parameters. Such information (i.e. the parameters) can then be used for active cancellation of interferers.

Yet another benefit includes removing the effects of a high-powered jamming signal. That is, the disclosed embodiments can operate even when a high-powered jamming signal is present in the input signal. Indeed, the disclosed embodiments are able to reduce the effects of a high-powered jamming signal even to the extent of 25 dB or more.

The embodiments provide additional benefits as well. For instance, the disclosed embodiments are able to use multiple signal processing techniques to achieve classification and very fine or granular parameter estimation of an unknown interferer. The parameter estimation error is sufficient to enable low-loop-bandwidth signal demodulation. The disclosed operations or algorithms also achieve high probabilities of acquisition at low interference-power-to-signal-power (J/S) ratios and low acquisition times and further enables low SWaP (size, weight, and price) requirements. Additionally, the disclosed embodiments beneficially classify signals and finely estimate signal parameters such that an interferer can be removed through demodulation, remodulation, and subtraction (e.g., active cancellation).

Accordingly, these and numerous other benefits will now be described throughout the remaining portions of this disclosure.

RF Communications

To establish an RF communication link, an electronic device sends or receives an electromagnetic wave, such as a narrowband or wideband electromagnetic wave 100 illustrated in FIG. 1, to a transmitter/receiver. Electromagnetic wave 100 includes an electric field 105 and a magnetic field 110. Electromagnetic wave 100 may be launched by an antenna, and it may also be intercepted, or rather received by, the antenna.

Figure 2:
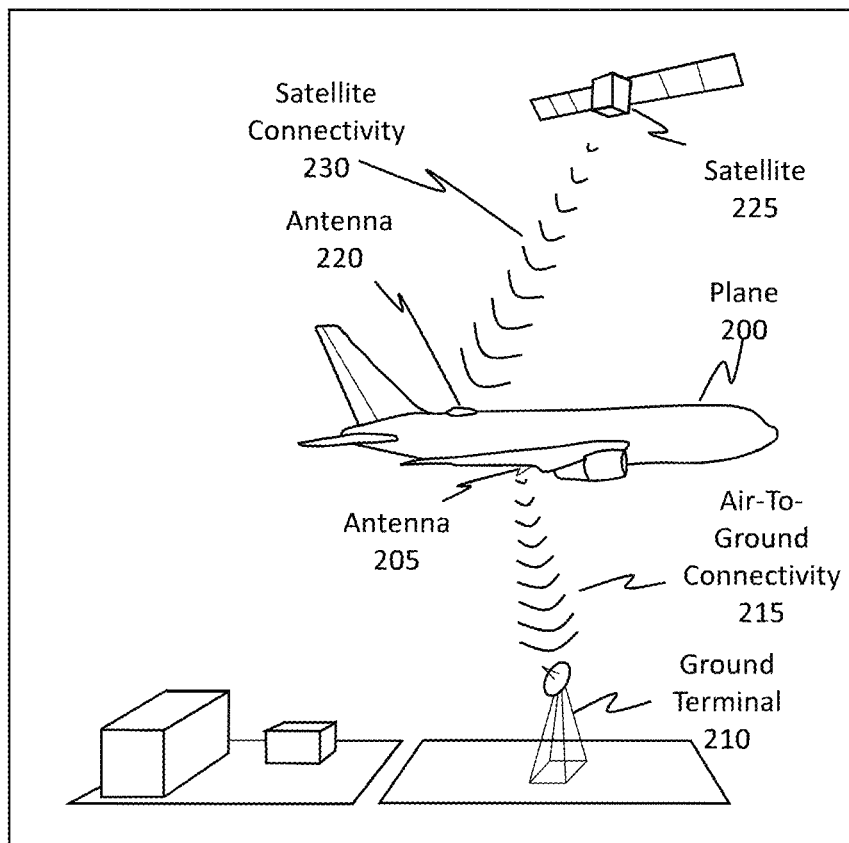
FIG. 2 illustrates how a device, perhaps situated within an airplane, can communicate with a ground terminal and/or with satellites using electromagnetic waves.

FIG. 2 shows how electromagnetic waves can be used to facilitate communications between multiple different devices. For example, FIG. 2 shows a plane 200 that includes an antenna 205. The plane 200 is using the antenna 205 to communicate with a ground terminal 210, as shown by the air-to-ground connectivity 215. Additionally, the plane 200 is using an antenna 220 to communicate with a satellite 225, as shown by satellite connectivity 230.

Figure 3:
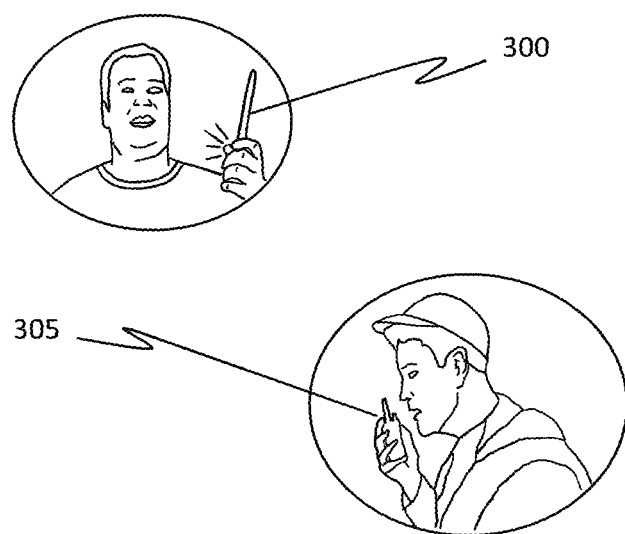
FIG. 3 illustrates how handheld devices can also communicate wirelessly using electromagnetic waves.

FIG. 3 shows another scenario in which RF communications occur via electromagnetic waves. Here, the RF communications are occurring between handheld devices, such as the walkie-talkies 300 and 305. Accordingly, one will appreciate how the disclosed embodiments can improve any type of RF communications, including communications between large scale devices and communications between small scale devices, or any combination of large and small scale devices.

Figure 4:
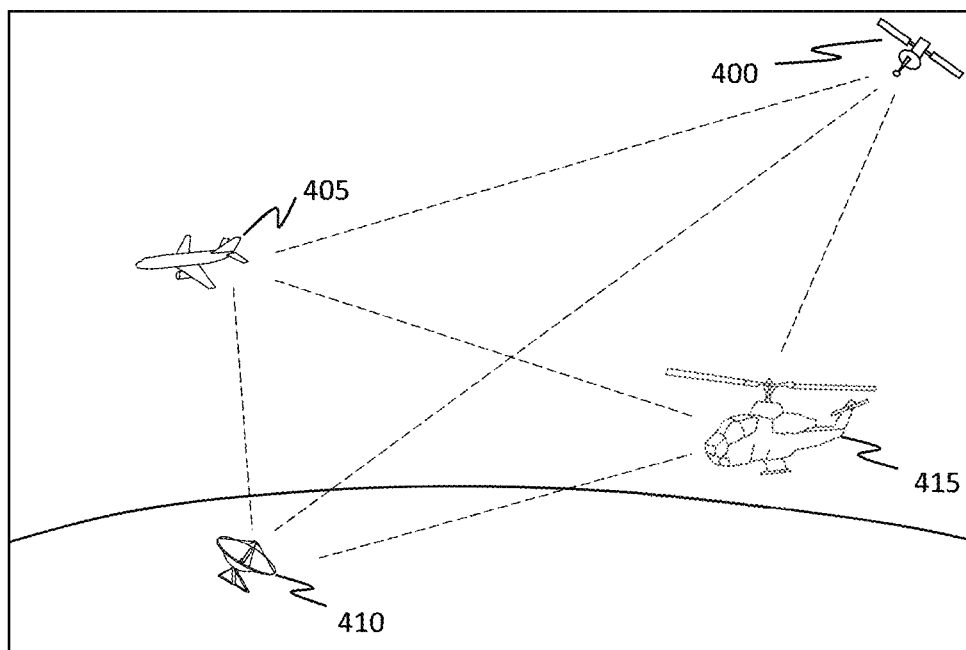
FIG. 4 illustrates how one device can concurrently communicate with multiple other devices. Such a scenario can sometimes lead to signal interference.

FIG. 4 shows a scenario in which a satellite 400 is concurrently or simultaneously communicating with multiple different devices. Of course, satellites are not the only type of device that can communicate simultaneously with other devices. As such, these figures are used for example purposes only.

Figure 5:
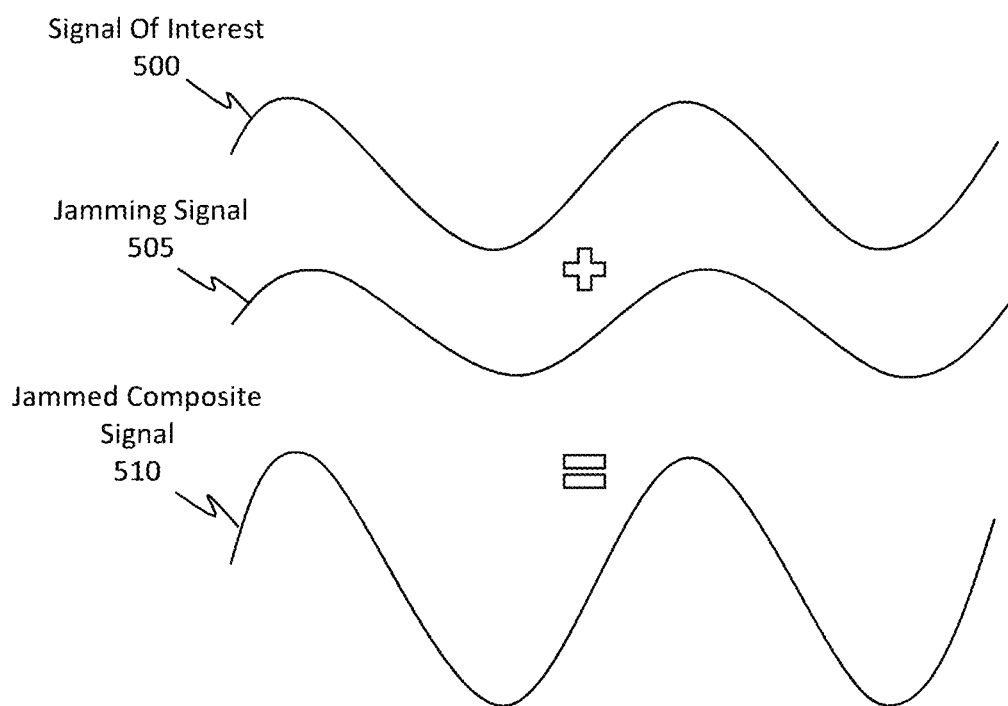
FIG. 5 illustrates how the transmission and/or reception of multiple electromagnetic waves can lead to a scenario where signals interfere or jam with one another.

Specifically, a satellite 400, an airplane 405, a ground terminal 410, and a helicopter 415 are all communicating with one another. As indicated above, it may be the case that all of these communications are happening simultaneously with one another. In some cases, an ad hoc mesh network is being used. In some cases, a CDMA mesh network is being used. Often, it is the case that each transmission uses a different frequency in order to communicate. Sometimes, however, multiple transmissions may use (i) the same frequency, (ii) an overlapping frequency range, and/or (iii) frequencies that are sufficiently near one another such that crosstalk or leakage occurs, thereby resulting in a scenario where the transmissions interfere with one another. In some cases, the interference may be innocent (e.g., an operator perhaps accidentally used the wrong frequency and interfered with another signal) while in other cases the interference may be intentional, such as a malicious use of jammer. FIG. 5 provides more detail.

FIG. 5 shows a signal of interest 500 and a jamming signal 505. The signal of interest 500 represents a signal, RF communication, or electromagnetic wave that is destined for an endpoint terminal using a particular frequency. The jamming signal 505 represents another signal that is using the same frequency, the same frequency range, or a frequency that is sufficiently near the frequency of the signal of interest 500 such that the jamming signal 505 interferes with the signal of interest 500. The jamming signal 505 can be a benign signal or a malign signal, as discussed above.

Because the frequencies of the signal of interest 500 and the jamming signal 505 are interfering with one another, the two (or potentially more than two) signals constructively or destructively combine with one another, resulting in a jammed composite signal 510. That is, the jammed composite signal 510 is a combination of the signal of interest 500 and the jamming signal 505. In effect, the jamming signal 505 has jammed or interfered with the signal of interest 500. If a receiving device were to receive the jammed composite signal 510 and not perform any extraction or mitigation operations to remove the jamming signal 505 component from the jammed composite signal 510, the receiving device would not be able to properly interpret the signal of interest 500. What is needed, therefore, is an improved technique for performing compensation or mitigation when a signal is interfered by at least one other signal.

Identifying Coarse Parameters of an Interfering Signal

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
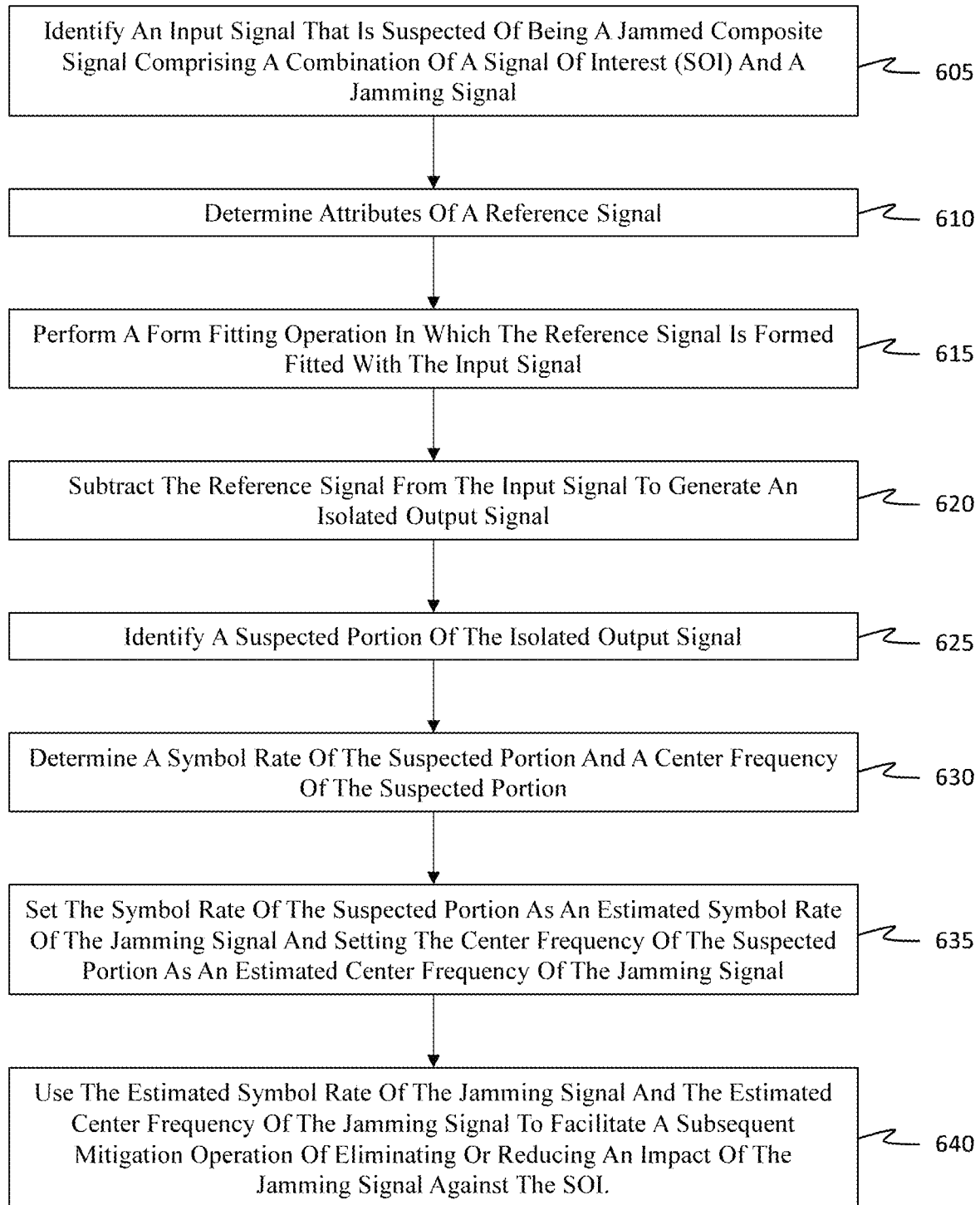
FIG. 6 illustrates a flowchart of an example method for identifying coarse parameters of a jamming signal.

Attention will now be directed to FIG. 6, which illustrates a flowchart of an example method 600 for inferring coarse information regarding aspects of an interfering signal to thereby lead to improved detection and parameter estimation of that interfering signal. The discussion regarding method 600 will be accompanied by a discussion of FIGS. 7 to 17.

Initially, method 600 is shown as including an act (act 605) of identifying an input signal that is suspected of being a jammed composite signal comprising a combination of a signal of interest (SOI) and a jamming signal. With reference to FIG. 5, the input signal may be the jammed composite signal 510, the SOI may be the signal of interest 500, and the jamming signal may be the jamming signal 505.

Figure 7:
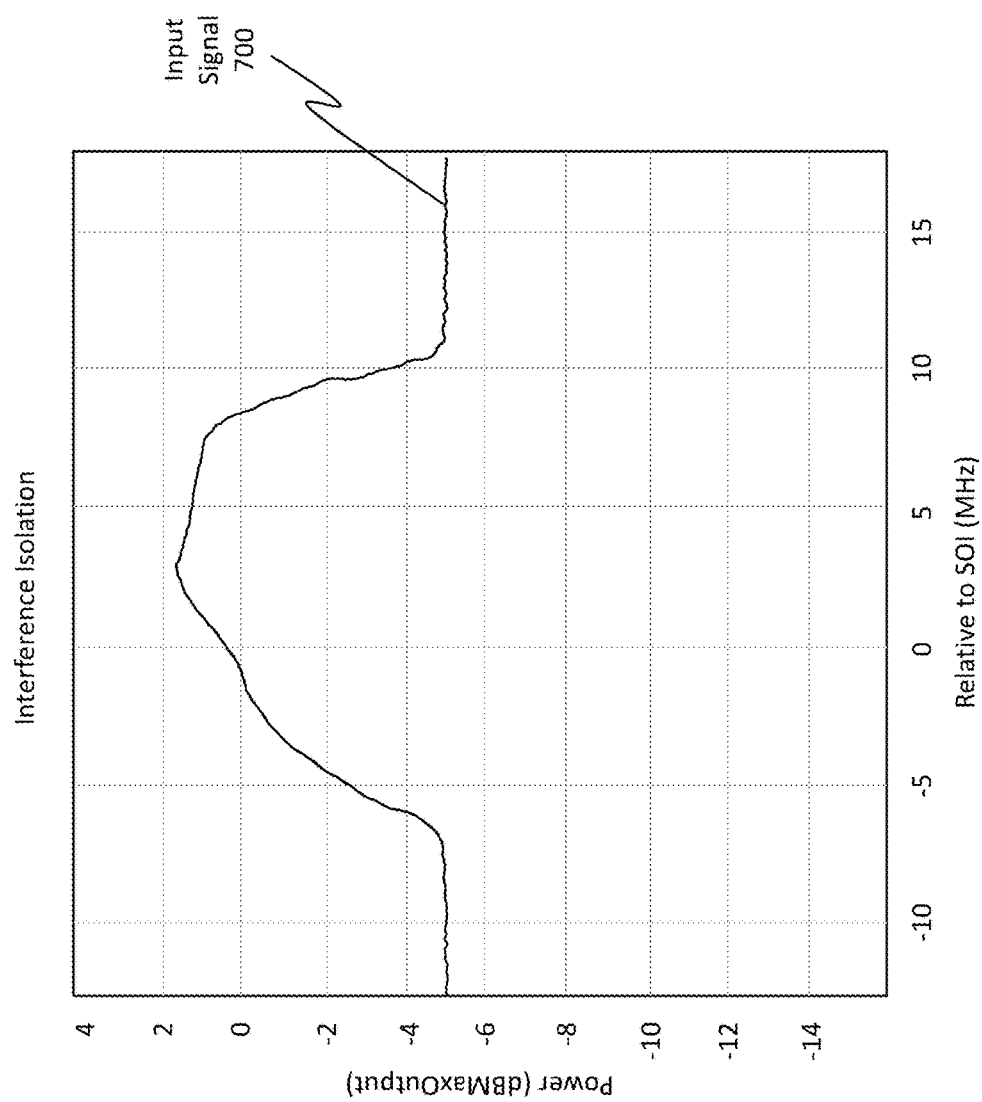
FIG. 7 illustrates an example waveform depicting an input signal, which is a composite signal comprising a signal of interest (SOI) and a jamming or interfering signal.

Turning briefly to FIG. 7, this figure illustrates a graph of a waveform depicting an example input signal 700, which can be received by any of the devices mentioned thus far and which is representative of the input signal mentioned in act 605. The graph has Power (dBMaxOutput) as the y-axis and Frequency Relative to SOI (MHz) as the x-axis. The waveform of the input signal 700 is shown for example purposes only and should not be construed as binding in any manner. Accordingly, the input signal 700 is a signal that is suspected of being a jammed composite signal, which includes a combination of a signal of interest (SOI) (e.g., signal of interest 500 from FIG. 5) and a jamming signal (e.g., jamming signal 505).

Figure 8:
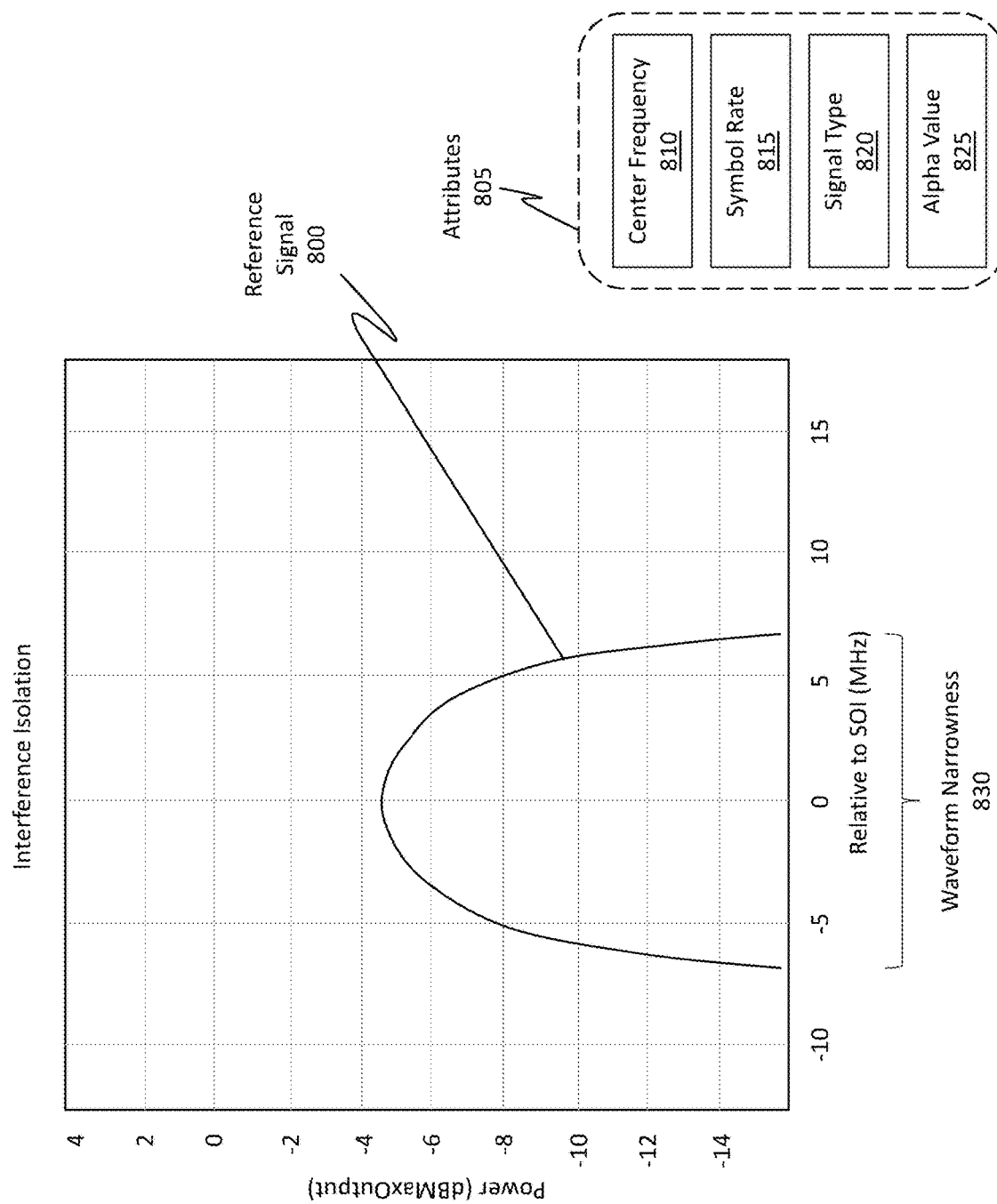
FIG. 8 illustrates an example waveform depicting a reference signal, which is an expected signal that a device is expecting to receive as opposed to the input signal the device actually received.

Returning to FIG. 6, method 600 includes an act (act 610) of determining attributes of a reference signal. Notably, prior to receiving the input signal mentioned earlier, two communicating devices can establish a link with one another. With the establishment of the link, each device has information regarding attributes or characteristics of the signal that will subsequently be received. The attributes include at least a center frequency of the reference signal and a symbol rate of the reference signal. The reference signal is an expected signal that was expected to be received in lieu of the input signal. FIG. 8 shows an example of a reference signal.

FIG. 8 shows a graph of an example waveform in the form of a reference signal 800 that has particular attributes 805. Whereas the input signal 700 of FIG. 7 represents an actual signal that is received at a device, the reference signal 800 represents a signal that is expected to be received at the device.

Stated differently, the waveform labeled reference signal 800 is the inferred and learned spectrum of an SOI The shape of that spectrum is inferred and learned from 1) known parameters, 2) assumed parameters, and/or 3) run-time experience. Any applied scaling is learned through optimization.

To further clarify, as discussed before, it is often the case that a received signal has been subject to interference. The difference in visual form and other characteristics between the input signal 700 and the reference signal 800 indicates that the input signal 700 has been interfered with in some manner. Stated differently, the input signal 700 is representative of the jammed composite signal 510 from FIG. 5, and the reference signal 800 is representative of the signal of interest 500 of FIG. 5. By knowing the attributes 805, it is possible (by following the techniques disclosed herein) to obtain a coarse estimation of the parameters of the jamming signal that is jamming the input signal 700 (i.e. to determine the parameters of the jamming signal 505 from FIG. 5).

During the initial link between the two communicating devices, the attributes 805 of the reference signal 800 are either transmitted or derived. Accordingly, the attributes of the reference signal are determined prior in time to a time when the input signal is received. The attributes 805 include, but might not be limited to, a center frequency 810 of the reference signal 800, a symbol rate 815 of the reference signal 800, a signal type 820 (or data structure or modulation type) of the reference signal 800 (e.g., a tone signal, a BPSK signal, a QPSK signal, a 8PSK signal, an offset QPSK, a CDMA (code-division multiple access), a 16 QAM, etc.), and an alpha value 825 of the reference signal 800. The alpha value 825 represents how fast the waveform rolls off. That is, the alpha value 825 represents how steep the curve is and how narrow the waveform is, as shown by waveform narrowness 830. Accordingly, the embodiments are able to determine the attributes 805 of the reference signal 800.

Figure 9:
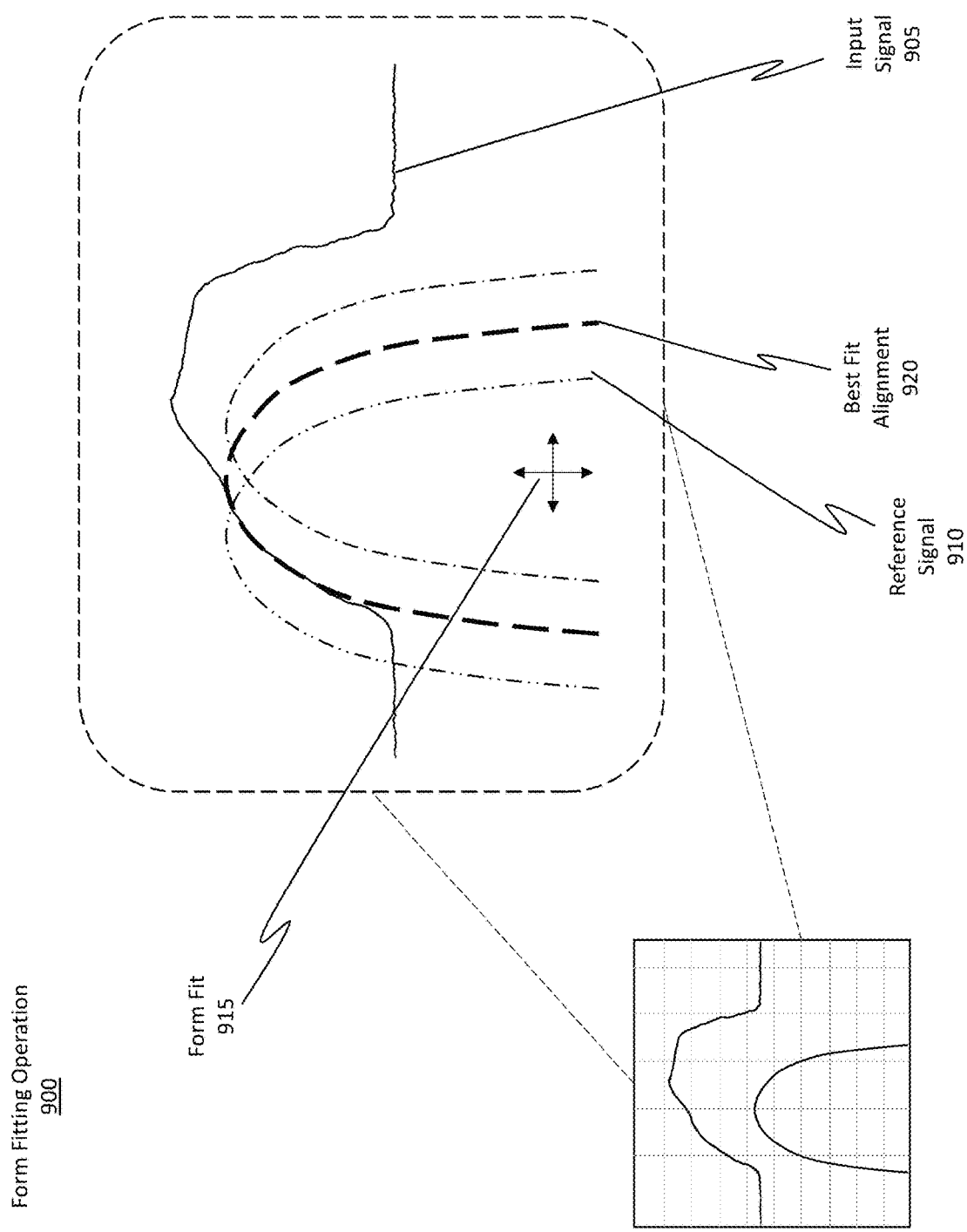
FIG. 9 illustrates an example form fitting operation in which the reference signal is form fitted to the input signal.

Returning to FIG. 6, method 600 includes an act (act 615) of performing a form fitting operation in which the reference signal is form fitted with the input signal to obtain a best fit alignment between the reference signal and the input signal. FIG. 9 is illustrative.

In particular, FIG. 9 shows an input signal 905, which is representative of the input signal 700 from FIG. 7, and a reference signal 910, which is representative of the reference signal 800 of FIG. 8. The form fitting operation 900 includes aligning (e.g., as shown by form fit 915) the reference signal 910 with the input signal 905 to find a best fit alignment 920 between those two waveforms.

To illustrate, FIG. 9 shows how the reference signal 910 can be moved left or right and/or up and down in the graph in order to find the best fit alignment between itself and the input signal 905. In the scenario shown in FIG. 9, the best fit alignment 920 between the reference signal 910 and the input signal 905 shows that the reference signal 910 fits best on the left-hand side of the input signal 905.

In some cases, the form fitting operations are performed by attempting to match or align as many points along the waveform of the reference signal 910 with as many points along the waveform of the input signal 905. Optionally, instead of a direct match or alignment in which one point is directly on top of another point, alignment can occur if one point is within a threshold value of another point. For example, in the context of FIG. 9, one point on the reference signal 910 may be considered to be aligned with a point on the input signal 905 if the reference signal point is within a threshold frequency value (e.g., perhaps 1 Hz, 2 Hz, 10 Hz, 100 Hz, 1,000 Hz, etc.) of the input signal value. Any threshold value may be used.

The alignment process may entail attempting to "align" a maximum number or, alternatively, a minimum threshold number of reference signal points with corresponding input signal points. Notice, in FIG. 9, the entirety of the reference signal 910 (even when at the location of the best fit alignment 920) does not fully align with the input signal 905. Instead, that alignment was selected because a maximum number of points (or at least a threshold number) on the reference signal 910 align with corresponding points on the input signal 905. Therefore, complete alignment or even a majority of alignment might not occur. In some cases, only a fractional alignment might occur, such as perhaps a 1% alignment, 2%, 3%, 4%, 5%, 10%, 15%, 20%, 25%, 30%, 35%, 40%, 45%, or more than 50% (e.g., 100%), or any value therebetween.

Accordingly, in some embodiments, performing the form fitting operation in which the reference signal is form fitted with the input signal includes aligning a threshold number of points of a waveform representative of the reference signal with a corresponding number of points of a waveform representative of the input signal. In some embodiments a level of overlap between the reference signal and the input signal is required to meet or satisfy an overlap requirement (e.g., anywhere between 1% overlap and 100% overlap). To overlap, points from the two waveforms do not necessarily or strictly need to be on top of one another; rather, the points can be within a threshold distance or frequency range relative to one another.

Some embodiments perform alignment by selecting a set of one or more points on the reference signal 910 and then aligning that set of one or more points with corresponding points on the input signal 905. The remaining points in the reference signal 910 can optionally be disregarded with regard to the alignment process. Accordingly, in some embodiments, performing the form fitting operation in which the reference signal is form fitted with the input signal includes selecting at least a set of points along a waveform representative of the reference signal and aligning the set of points with corresponding points of a waveform representative of the input signal. In this regard, alignment may occur by considering or aligning at least a set or subset of points in the reference signal 910 with the input signal 905.

In some embodiments, the alignment may occur by smoothing out the input signal 905 (e.g., to remove localized peaks and valleys) and then computing the waveform's tangent. The tangent of the reference signal 910 can also be determined. The alignment process can then be performed by matching or aligning areas along the curves where the two tangent values match one another or are within a threshold value of one another. In some cases, the smoothing operation might not be performed, but the tangent determination is performed.

Accordingly, the embodiments are able to perform a form fitting operation 900 in which the reference signal 910 is form fitted with the input signal 905 to obtain a best fit alignment 920 between the reference signal 910 and the input signal 905.

Figure 10:
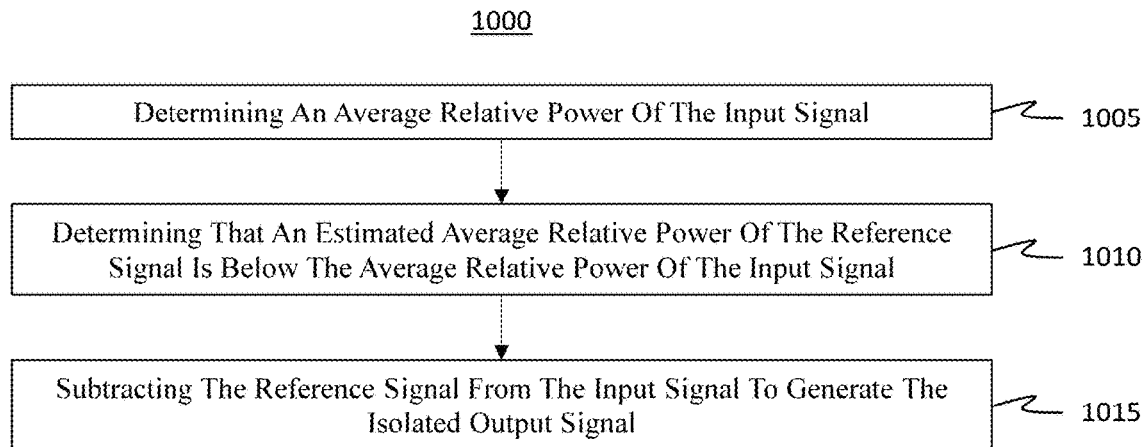
FIG. 10 illustrates an example process for subtracting the reference signal from the input signal to generate the isolated output signal.
Figure 11:
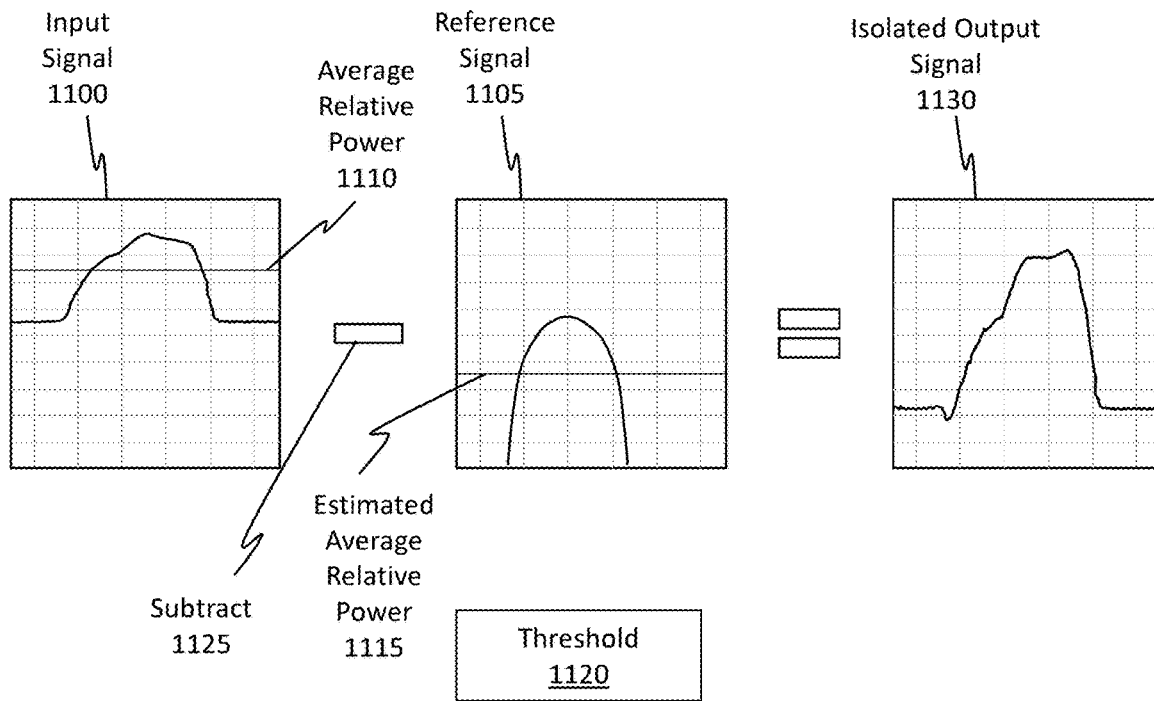
FIG. 11 illustrates an example operation in which the form fitted reference signal is subtracted from the input signal to produce an isolated output signal.

Returning to FIG. 6, after a best fit alignment is determined between the reference signal and the input signal, there is an act (act 620) of subtracting the reference signal from the input signal to generate an isolated output signal. FIGS. 10 and 11 are illustrative.

Specifically, FIG. 10 shows a process 1000 of the subtraction technique mentioned above. Initially, the process 1000 includes an act (act 1005) of determining an average relative power of the input signal.

Turning briefly to FIG. 11, this figure shows an input signal 1100 and a reference signal 1105, both of which are representative of their corresponding signals mentioned earlier. To facilitate the subtraction process, the embodiments determine an average relative power 1110 of the input signal.

Based on the average relative power 1110 of the input signal 1100, the process 1000 of FIG. 10 includes an act (act 1010) of determining that an estimated average relative power of the reference signal is a threshold amount below the average relative power of the input signal. To illustrate, FIG. 11 shows how the estimated average relative power 1115 of the reference signal 1105 is a threshold 1120 amount below the average relative power 1110 of the input signal 1100.

The threshold 1120 amount is often between about 3 dB and 5 dB. Consequently, the estimated average relative power 1115 of the reference signal 1105 is typically between about 3 dB to 5 dB below the average relative power 1110 of the input signal 1100. In some cases, the threshold is between about 2 dB and about 6 dB. It may be the case, however, that the range is larger, such as perhaps between about 1 dB and about 10 dB.

The process 1000 of FIG. 10 then includes an act (act 1015) of subtracting the reference signal (including its estimated average relative power) from the input signal (including its average relative power). In FIG. 11, the subtract 1125 is reflective of act 1015. The result of the subtract 1125 process is the isolated output signal 1130, which was also introduced in method act 620 of FIG. 6.

By way of additional clarification, as seen by the input signal 1100, the interferer is scarcely seen in that spectral input. However, the isolated output signal 1130 not only clearly reveals the interferer signal, but also reveals the support and location of the interferer, thereby enabling solid interference bandwidth and center-frequency coarse estimation. These coarse estimates are beneficial for down-stream interference classification and fine parameter estimation. Accordingly, the disclosed operations significantly improve the ability and probability of detecting interference signals and even reduces parameter estimation bias in the presence of SOI(s).

Figure 12:
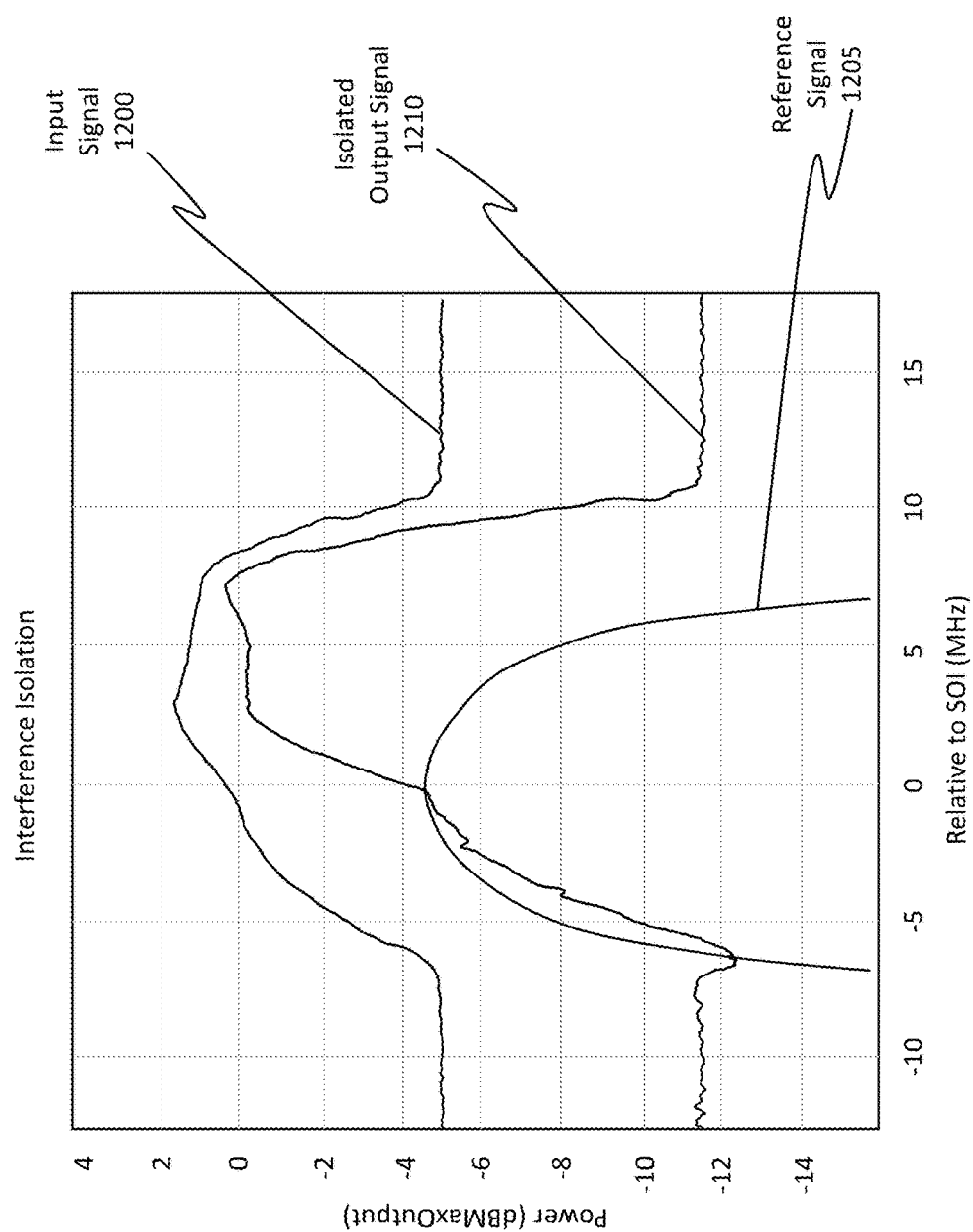
FIG. 12 illustrates an example graph illustrating the three different waveforms mentioned above, including the input signal, the reference signal, and the isolated output signal.

FIG. 12 shows a graph depicting the three different waveforms. Specifically, FIG. 12 shows an input signal 1200, a reference signal 1205, and an isolated output signal 1210. These three waveforms are representative of the three waveforms illustrated in FIG. 11 and the other figures as well.

Figure 13:
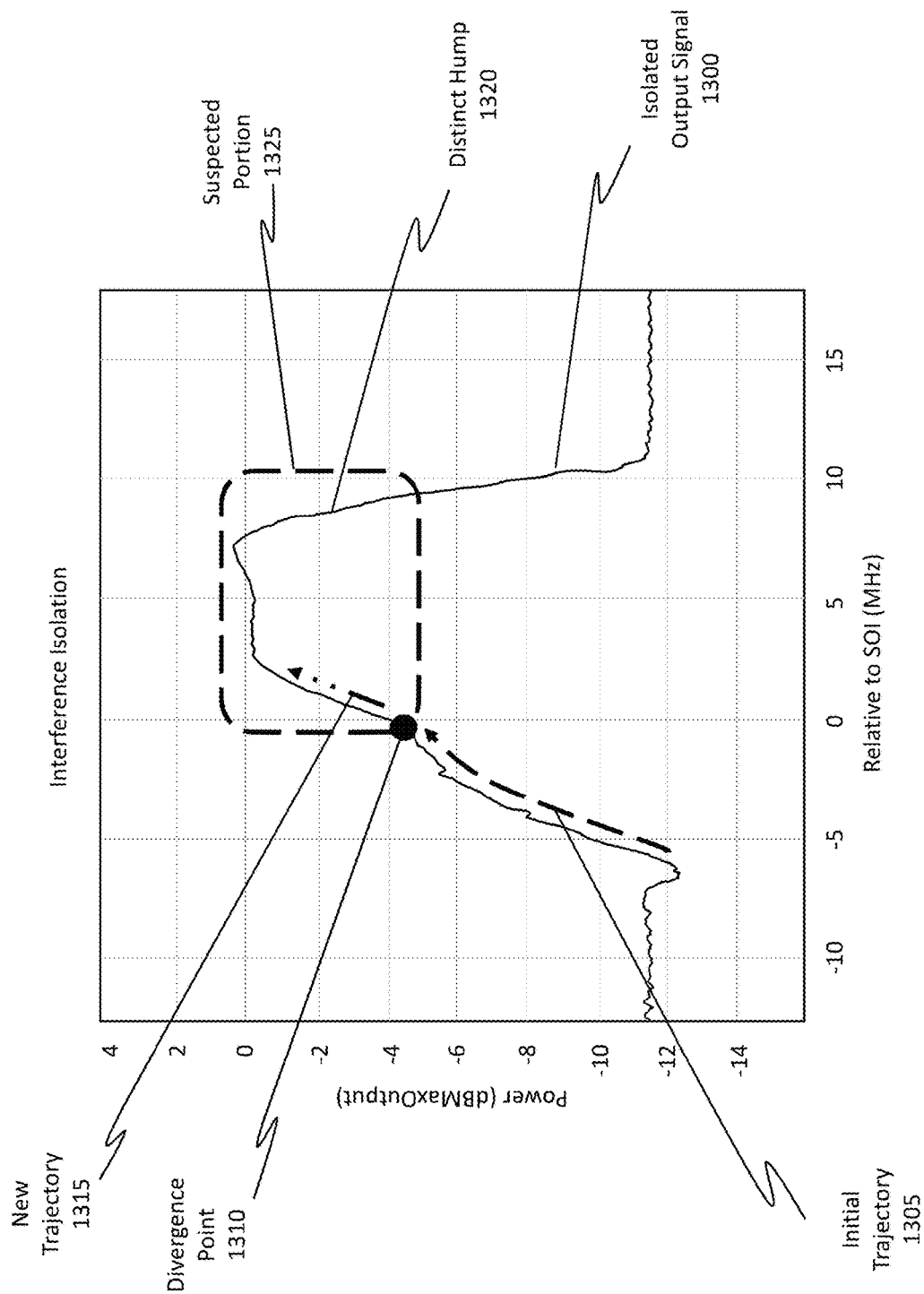
FIG. 13 illustrates how the isolated output signal includes a distinct hump portion, which is a suspected portion that is suspected of representing the jamming signal or of representing the frequency range where the jamming signal is occurring.

Returning to FIG. 6, method 600 includes an act (act 625) of identifying a suspected portion of the isolated output signal where the jamming signal is likely to be occurring. FIG. 13 is illustrative.

FIG. 13 shows an isolated output signal 1300, which is representative of the isolated output signals mentioned thus far. Notice, this waveform has a distinct hump or peak where the waveform increases or changes significantly from the initial trend or trajectory of the waveform. That is, the dotted arrow labeled initial trajectory 1305 shows how the waveform generally follows a particular path or trajectory. Then, at the divergence point 1310, the waveform follows an entirely different path or trajectory, as shown by new trajectory 1315. The area of the waveform surrounded by the dotted lines emphasizes a so-called distinct hump 1320. The embodiments are able to analyze waveforms to identify divergence points (i.e. areas where the tangent of the line changes a threshold amount such that a distinct hump is formed) in order to identify humps, or so-called suspected portions, such as suspected portion 1325. The suspected portion 1325 is the area in the waveform that is suspected of being an area or frequency range where the jamming signal is likely to be occurring. Accordingly, the process of identifying the suspected portion of the isolated output signal where the jamming signal is likely to be occurring can be performed by identifying a distinct hump in the isolated output signal and/or by identifying a hump in a corresponding parabolic function that aligns with the isolated output signal.

In some embodiments, a machine learning (ML) algorithm is used to identify trajectory changes in a waveform, or rather, to identify distinct humps that are suspected of corresponding to a jamming signal. Any type of ML algorithm, model, machine learning, or neural network may be used to identify distinct humps that may constitute a suspect or suspected portion. As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations. Accordingly, a ML algorithm can be used to identify the suspected portion of the isolated output signal, where the ML algorithm is implemented using any of the techniques described above.

Figure 14:
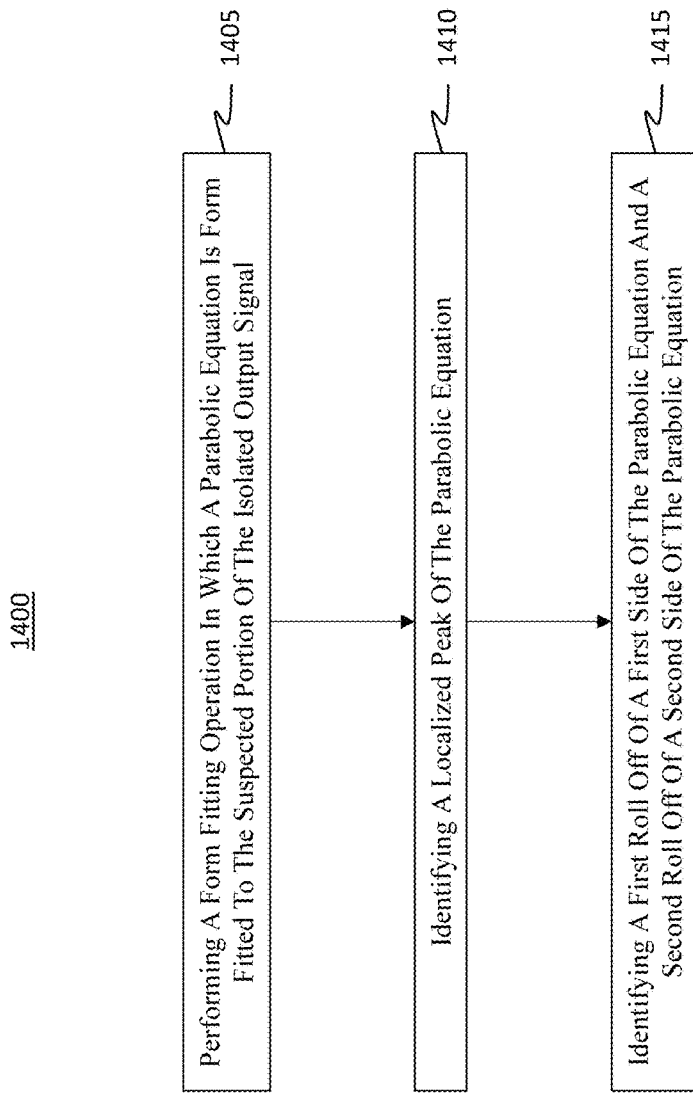
FIG. 14 illustrates an example process for identifying the roll off locations of a parabolic equation.
Figure 15:
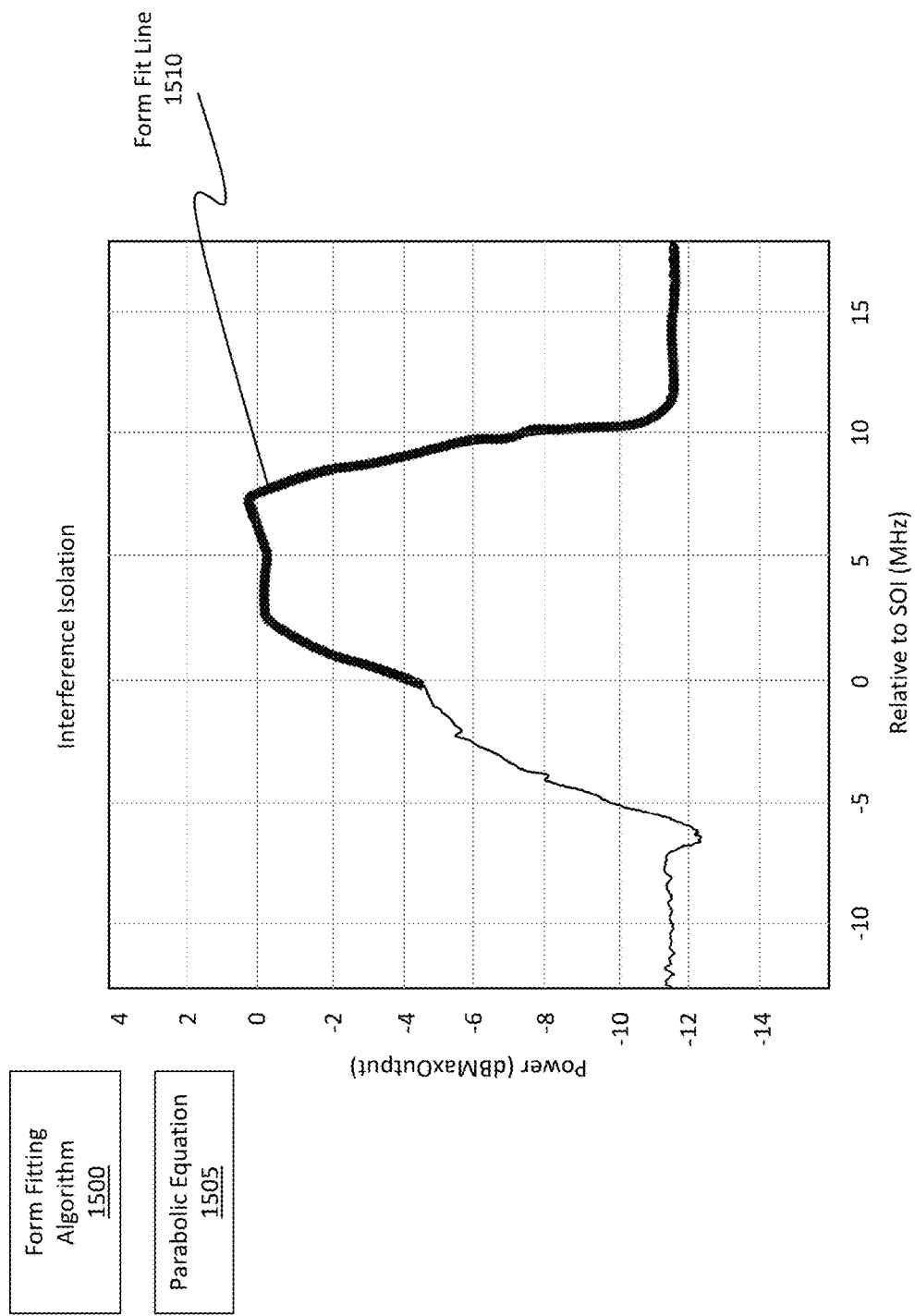
FIG. 15 illustrates how a form fitting algorithm can be used to map or generate a parabolic equation that is form fitted against the suspected portion of the isolated output signal.
Figure 16:
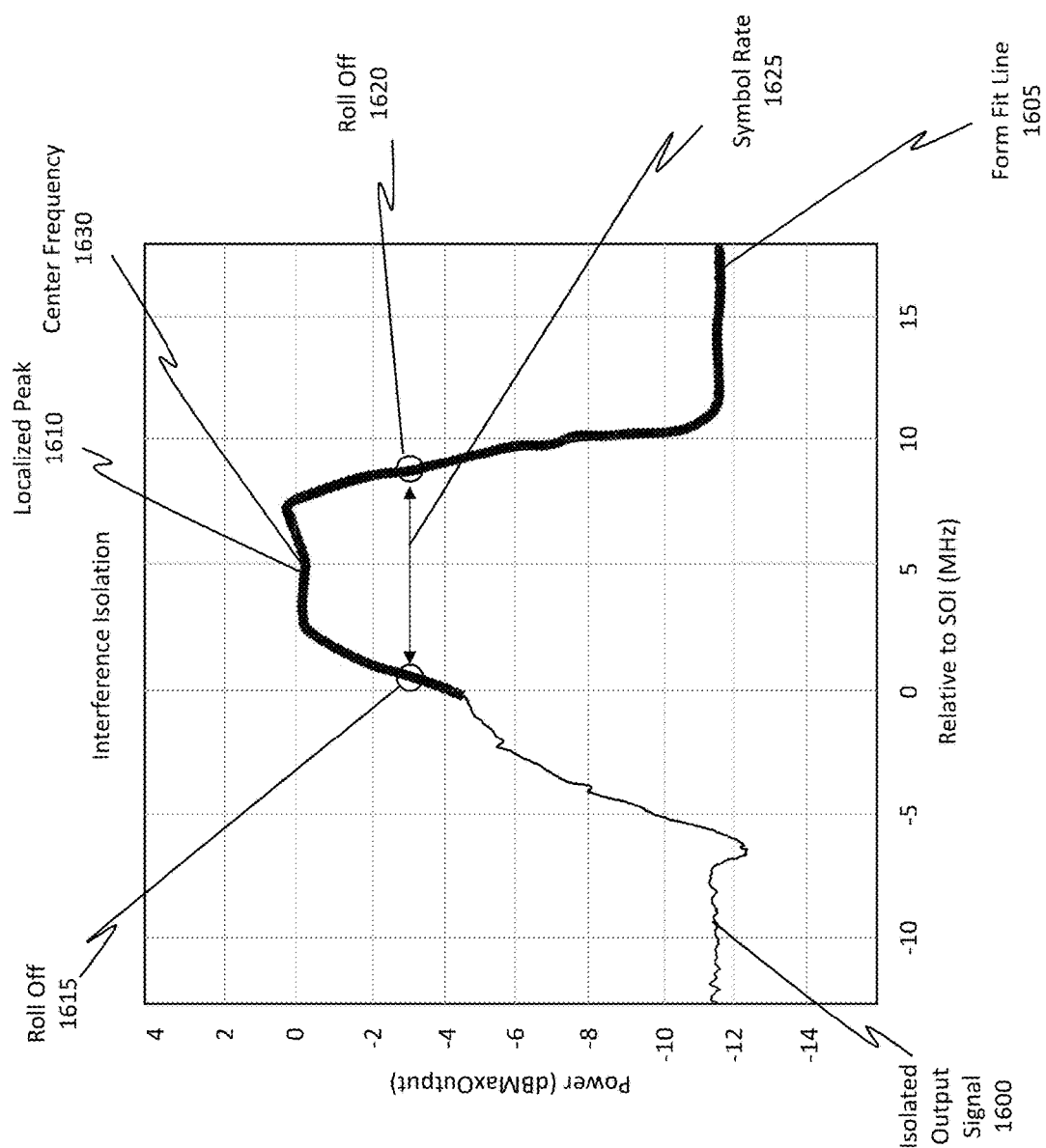
FIG. 16 illustrates how a symbol rate and a center frequency can be determined for the distinct hump portion of the isolated output signal, where the symbol rate and the center frequency represent coarse parameters of the jamming signal.

Returning to FIG. 6, method 600 then includes an act (act 630) of determining a symbol rate of the suspected portion and a center frequency of the suspected portion. FIGS. 14, 15, and 16 are illustrative.

Specifically, FIG. 14 illustrates an example process 1400 that may be performed in order to determine the symbol rate and center frequency of the suspected portion, as recited in act 630 of method 600. Initially, process 1400 includes an act (act 1405) of performing a form fitting operation in which a parabolic equation is form fitted to the suspected portion of the isolated output signal. FIG. 15 shows such a process.

In particular, FIG. 15 shows the use of a form fitting algorithm 1500 that uses a parabolic equation 1505 (or perhaps some other type of equation) in order to generate a form fit line 1510 that tracks or generally matches at least the area of the isolated output signal corresponding to the suspected portion.

In FIG. 14, the process 1400 then includes an act (1410) of identifying a localized peak or valley of the parabolic equation, or rather of the form fitted line. FIG. 16 shows an example.

FIG. 16 shows an isolated output signal 1600 and a form fit line 1605, which are representative of the corresponding features mentioned earlier. A localized peak 1610 is also identified for the form fit line 1605.

Returning to FIG. 14, the process 1400 also includes an act (act 1415) of identifying a first roll off of a first side of the parabolic equation (or form fit line) and a second roll off of a second side of the parabolic equation. In FIG. 16, the embodiments identified the roll off 1615 and the roll off 1620. In some embodiments, the roll offs (e.g., roll off 1615 and 1620) are selected to be about 3 dB less than the localized peak 1610 on each side of the peak. In some embodiments, the roll offs are selected to be a threshold amount less than the localized peak 1610, where the threshold amount can be anywhere including and between about 1 dB and about 5 dB.

With the roll offs 1615 and 1620 now known, the embodiments can determine a symbol rate 1625, which is the frequency range that exists between the roll offs 1615 and 1620. To clarify, the symbol rate of the suspected portion is determined based on the first roll off 1615 and the second roll off 1620, or rather, based on the difference between those two values. In this example scenario, the roll off 1615 is at about 1 MHz, and the roll off 1620 is at about 8 MHz. The symbol rate 1625 is then computed as the difference between those two values, resulting in a symbol rate 1625 of about 7 MHz. Additionally, the center frequency 1630 is selected as the center frequency value between the two roll offs 1615 and 1620. In this example case, the center frequency 1630 is about 5 MHz, or slightly below. That is, the center frequency of the suspected portion is determined based on a center frequency value of the parabolic equation between the first roll off 1615 and the second roll off 1620.

The roll offs 1615 and 1620 and the center frequency 1630 are then selected to operate as the symbol rate and the center frequency of the suspected portion, as described in method act 630 in FIG. 6. These values constitute coarse estimates of what the actual or true symbol rate and center frequency are likely to be for the actual jamming symbol. Generally, the estimated symbol rate (which is that of the jamming symbol) is within a first range between about 500 kilohertz and about 700 KHz of an actual symbol rate of the jamming signal. Similarly, the estimated center frequency is within a second range between about 500 KHz and about 700 KHz of an actual center frequency of the jamming signal. In some cases, the estimated center frequency is within a range between about 400 KHz and about 800 KHz of an actual center frequency of the jamming signal (i.e. the carrier frequency).

Returning to FIG. 6, method 600 then includes an act (act 635) of setting the symbol rate of the suspected portion as an estimated symbol rate of the jamming signal and setting the center frequency of the suspected portion as an estimated center frequency of the jamming signal. Act 640 then involves using the estimated symbol rate of the jamming signal and the estimated center frequency of the jamming signal to facilitate a subsequent mitigation operation of eliminating or reducing an impact of the jamming signal against the SOI. An example of the mitigation operation includes, but is not limited to, removing the effects of the jamming signal from the input signal in order to accurately reproduce or identify the SOI. Such removal can later occur via use of a demod-remod circuit, which will be discussed in more detail later.

Figure 17:
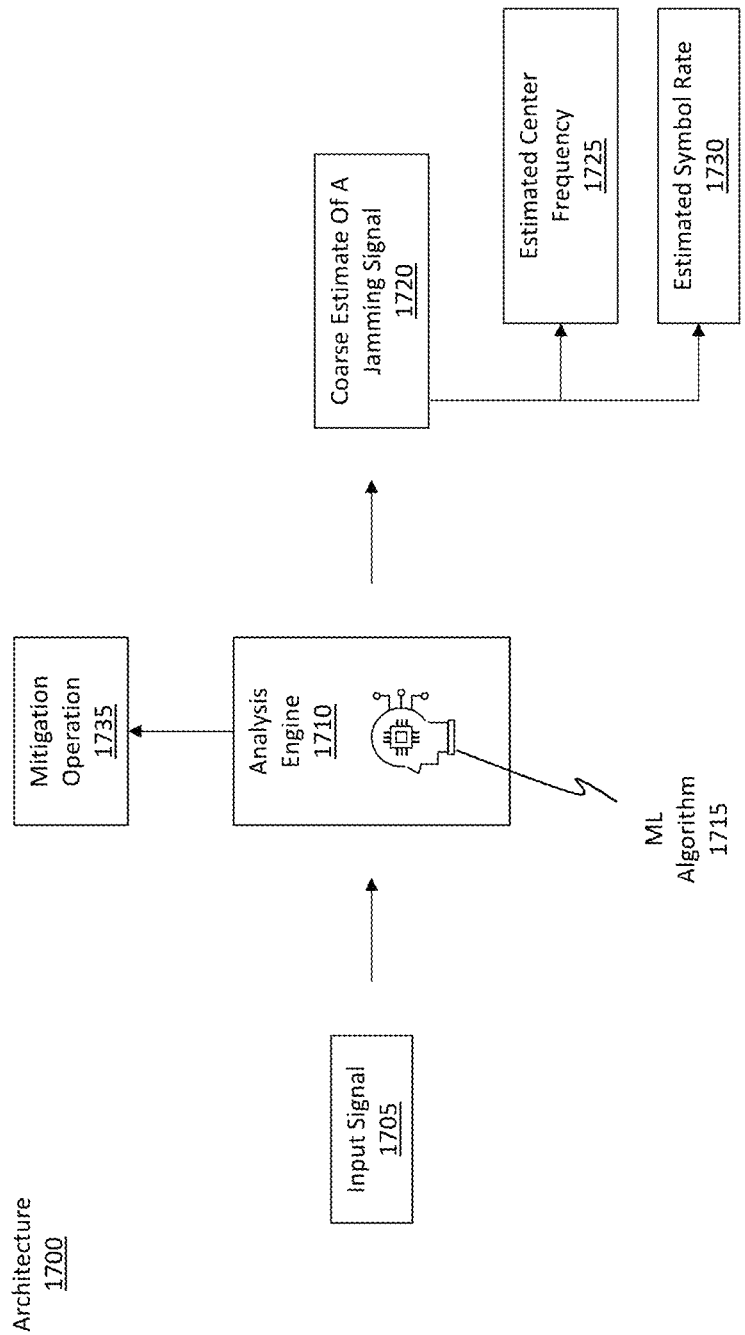
FIG. 17 illustrates an example architecture in which coarse parameters of a jamming signal can be identified.

FIG. 17 illustrates an example architecture 1700 that may be used to facilitate the disclosed operations. Here, the architecture 1700 is shown as receiving an input signal 1705, which is representative of the input signals mentioned thus far. The input signal 1705 is fed as input into an analysis engine 1710 that performs the acts described in method 600. In some implementations, the analysis engine 1710 is or includes a ML algorithm 1715 configured to perform the disclosed operations. As a result of performing the operations described in method 600, the analysis engine 1710 generates a coarse estimate of a jamming signal 1720. This coarse estimate includes an estimated center frequency 1725 and an estimated symbol rate 1730. Other parameters of the jamming signal may also be determined. Based on at least the estimated center frequency 1725 and the estimated symbol rate 1730, the analysis engine 1710 can perform one or more mitigation operations, as shown by mitigation operation 1735, in order to remove, eliminate, reduce, or dampen the effects of the jamming signal on the SOI.

Accordingly, the disclosed embodiments are beneficially configured to infer coarse information regarding aspects of an interfering signal to thereby lead to improved detection and parameter estimation of a jamming signal. By deriving these coarse parameters, the embodiments are better able to respond to scenarios where a jamming signal is interfering with a SOI.

Multi-Stage Iterative Scheme to Determine Fine Granularity Estimates of Jamming Signal Parameters Up to this point, the disclosure has focused on a technique for determining a coarse estimate of a jamming signal's parameters. Now, the disclosure will focus on a multi-stage iterative scheme or process for determining fine granularity estimates of parameters of an interfering signal and for using the fine granularity estimate to reduce or eliminate an impact of the interfering signal against the SOI. Generally, the disclosed embodiments use a Fast Fourier Transform (FFT) along with multiple signal processing techniques to enable a staged and distributed approach to incrementally reduce the estimation error and to achieve low hardware utilization (e.g., FPGA, processor, etc.). The low SWaP approach allows the disclosed techniques to be co-hosted along with other high-resource-utilization processing, such as complex waveforms.

Beneficially, the embodiments do not rely on a large FFT to produce the fine resolution required. Instead, the embodiments use (i) a moderately sized FFT, (ii) non-linear functions (e.g., to produce narrow-band tones), (iii) a difference technique (e.g., to identify the tones), and (iv) multi-rate processing and a bin interpolation techniques (e.g., to finely resolve the tones and to produce the low estimation errors required for narrow-loop-bandwidth pull in). At a high level, the disclosed techniques start with an unknown signal (e.g., the input signal) and achieve detection, classification, and fine parameter estimation in substantially real time. This process is referred to as signal acquisition and occurs in a short period of time (e.g., approximately one second or less). Furthermore, this approach assures that the latency (i.e. the time between signal input and signal output) is not increased by signal acquisition, thus providing latency in the tens of microseconds.

Beneficially, the carrier frequency estimation error is approximately 0.000025% of the actual carrier frequency. The symbol rate estimation error is about 0.04% of the actual symbol rate. Previous known approaches for producing such low estimation errors either resulted in very high gate counts or very long acquisition times. The disclosed approach produces low estimation errors with methods that enable distributed processing across hardware and software and achieve low acquisition times and low complexity.

Figure 18:
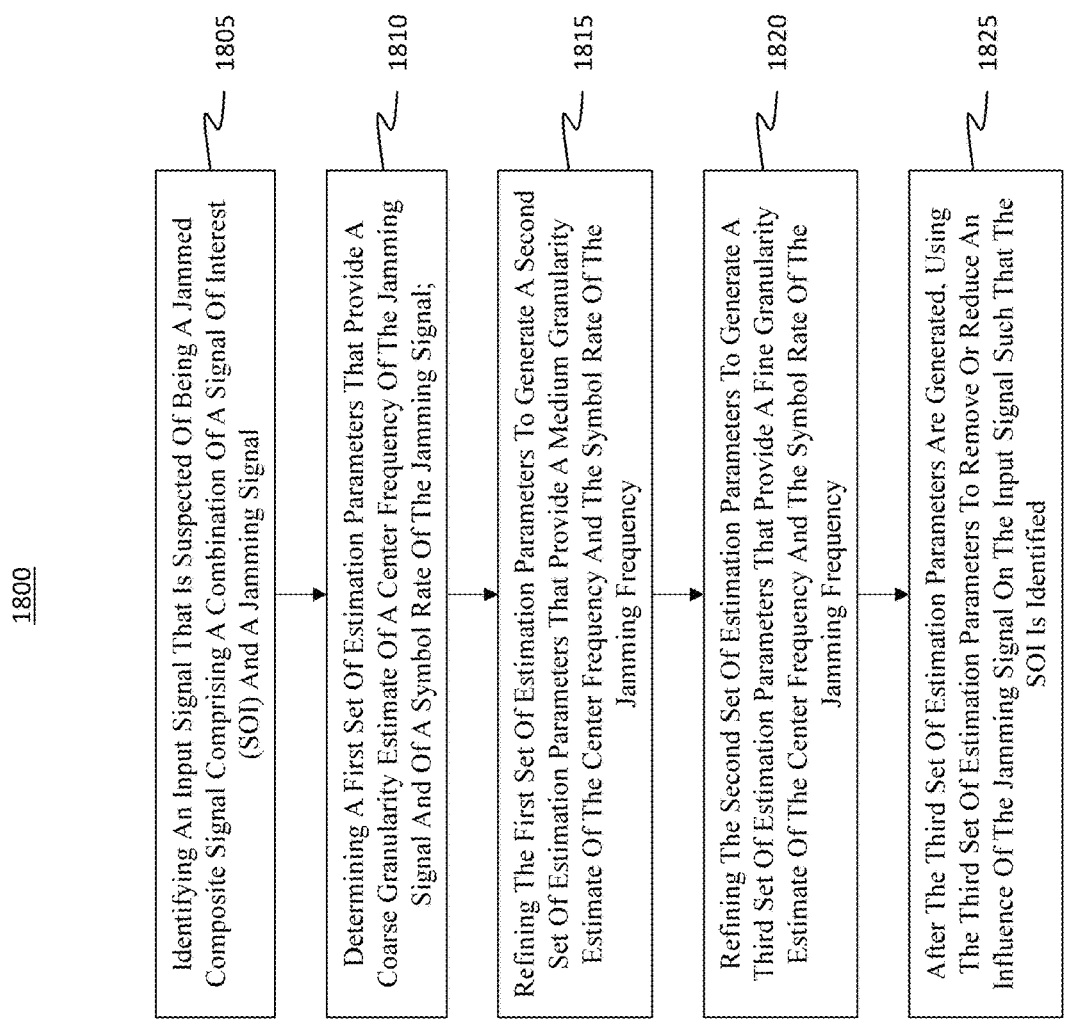
FIG. 18 illustrates a flowchart of an example method for performing a multi-stage iterative scheme to determine fine granularity attributes or parameters of a jamming signal and for reducing the influence of that jamming signal on a SOT.

With that background, attention will now be directed to FIG. 18, which illustrates a flowchart of an example method 1800 for providing the multi-stage approach discussed above. Initially, method 1800 includes an act (act 1805) of identifying an input signal that is suspected of being a jammed composite signal comprising a combination of a signal of interest (SOI) and a jamming signal. Act 1805 is similar to act 605 of method 600.

Method 1800 also includes an act (act 1810) of determining a first set of estimation parameters that provide a coarse granularity estimate of a center frequency of the jamming signal and of a symbol rate of the jamming signal. Determining the first set of estimation parameters can be performed by following the steps outlined in method 600. By following the processes outlined in method 600, the embodiments are able to generate a coarse granularity estimate of the center frequency and symbol rate of the jamming signal. Accordingly, method 600 provides details on how to accomplish act 1810.

Method 1800 then includes an act (act 1815) of refining the first set of estimation parameters to generate a second set of estimation parameters. This second set provides a medium granularity estimate of the center frequency and the symbol rate of the jamming frequency. Notably, the medium granularity estimate of the center frequency and the symbol rate is relatively closer to actual values of the center frequency and the symbol rate than a relative closeness provided by the coarse granularity estimate of the center frequency and the symbol rate. For instance, whereas the coarse granularity estimate for the symbol rate might be within about 700 KHz of the actual symbol rate, the medium granularity estimate will be within about 40 KHz of the actual symbol rate. FIGS. 19 through 25 provide additional details on this refining process.

Figure 19:
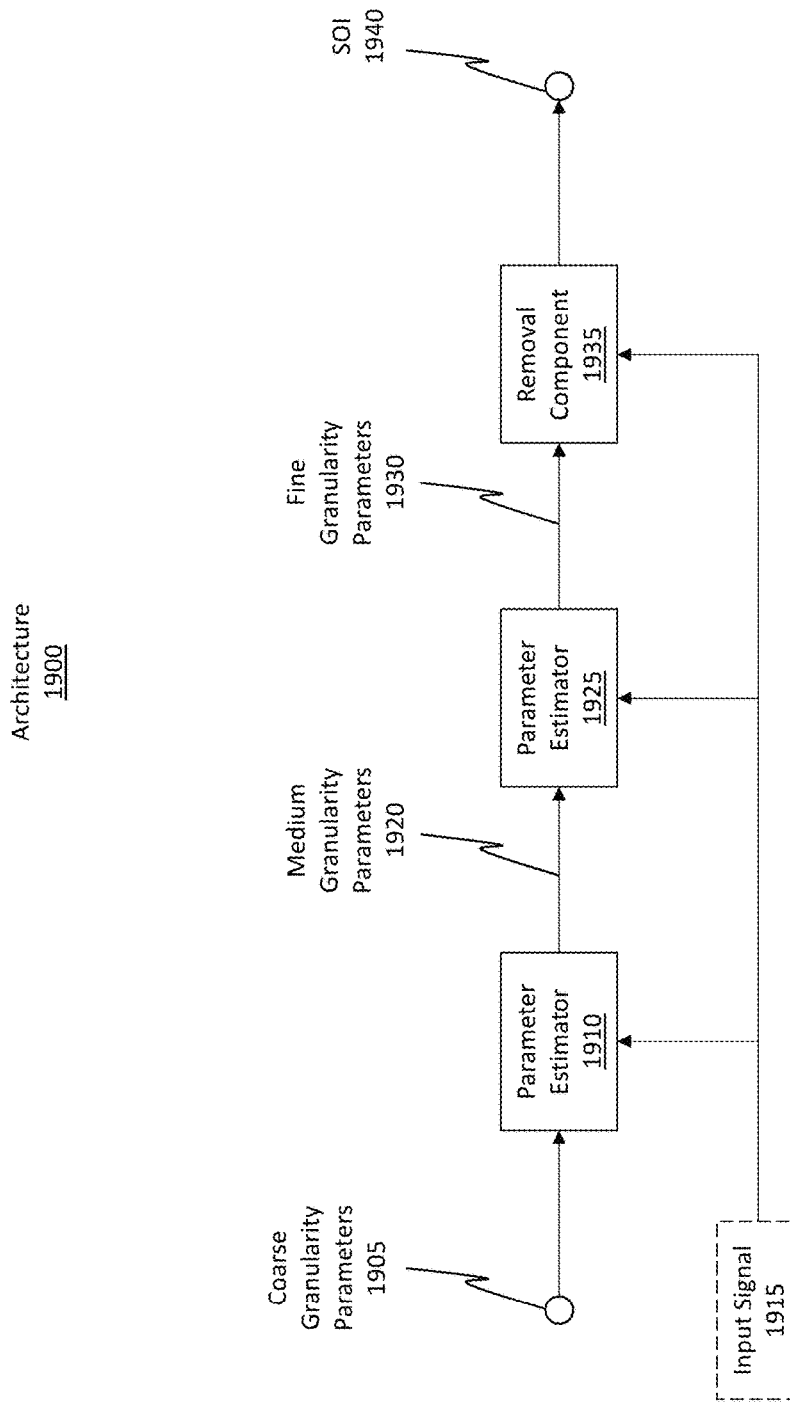
FIG. 19 illustrates an architecture for performing the multi-stage iterative scheme.
Figure 20:
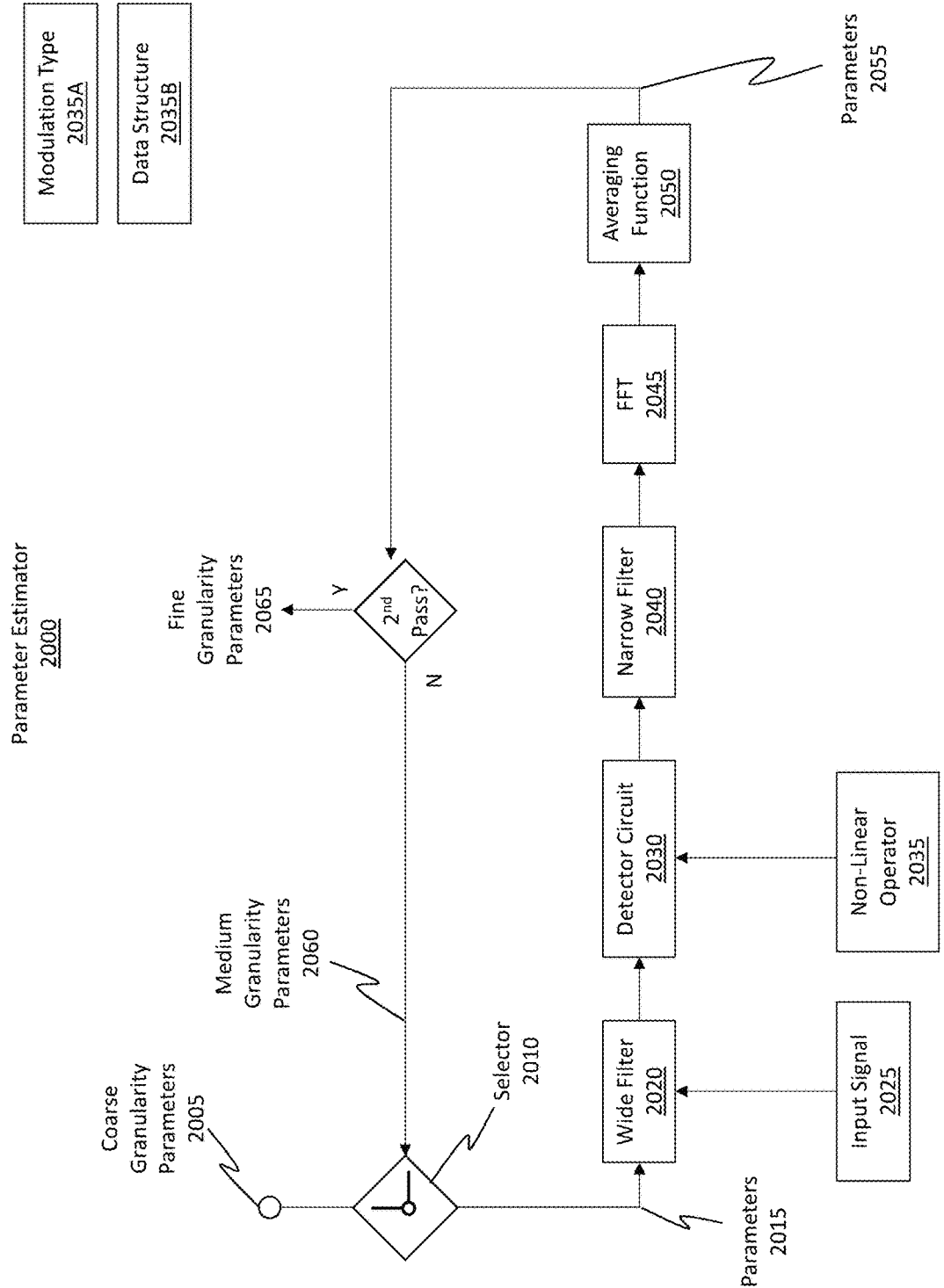
FIG. 20 illustrates an architecture for a parameter estimator.

FIG. 19 shows an example architecture 1900. Initially, a set of coarse granularity parameters 1905, which are representative of the coarse granularity estimates described in act 1810, are provided as input to a parameter estimator 1910. The input signal 1915, which is representative of the input signals mentioned throughout this disclosure, is also provided as input to the parameter estimator 1910. As will be discussed in more detail shortly, the parameter estimator 1910 is able to generate a set of medium granularity parameters 1920, which are representative of the medium granularity estimate mentioned in act 1815. FIG. 20 provides detail on how the parameter estimator 1910 operates.

FIG. 20 shows a parameter estimator 2000. Initially, the coarse granularity parameters 2005, which are representative of the coarse granularity parameters 1905 of FIG. 19, are received as input to a selector 2010 switch, which can select which input to use. Notably, the embodiments are configured to use the parameter estimator 2000 at least twice, so the selector 2010 is provided to determine or select which input is fed into the estimator during each usage.

Figure 21:
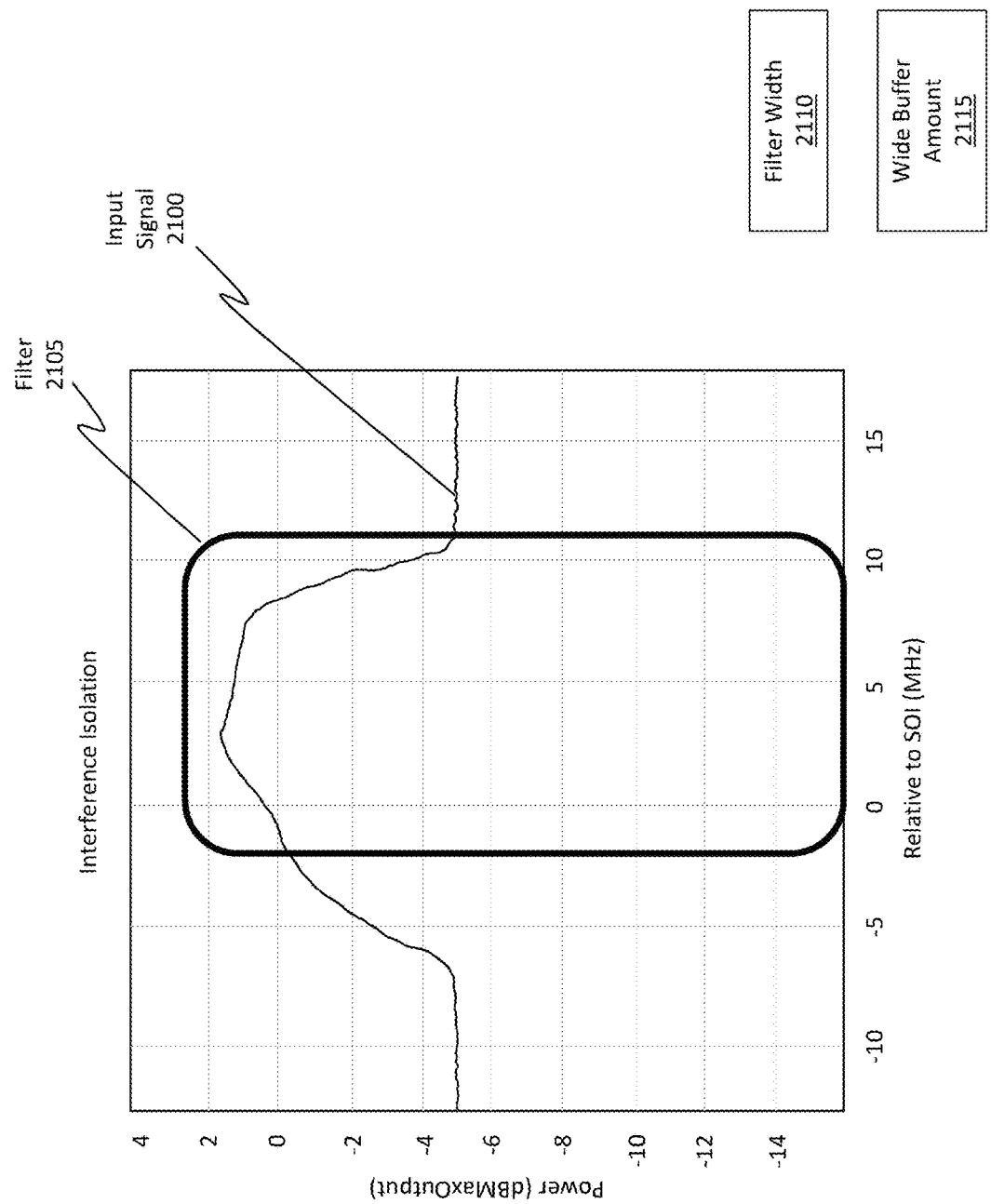
FIG. 21 illustrates a graph in which a filter is being applied to the input signal.

Whichever parameters are selected using the selector 2010 are now referred to as parameters 2015. These parameters 2015 are fed as input into a wide filter 2020, which is a type of down-sampling low-pass filter. The wide filter 2020 uses the parameters 2015 to filter the input signal 2025. FIG. 21 provides additional details.

Figure 22:
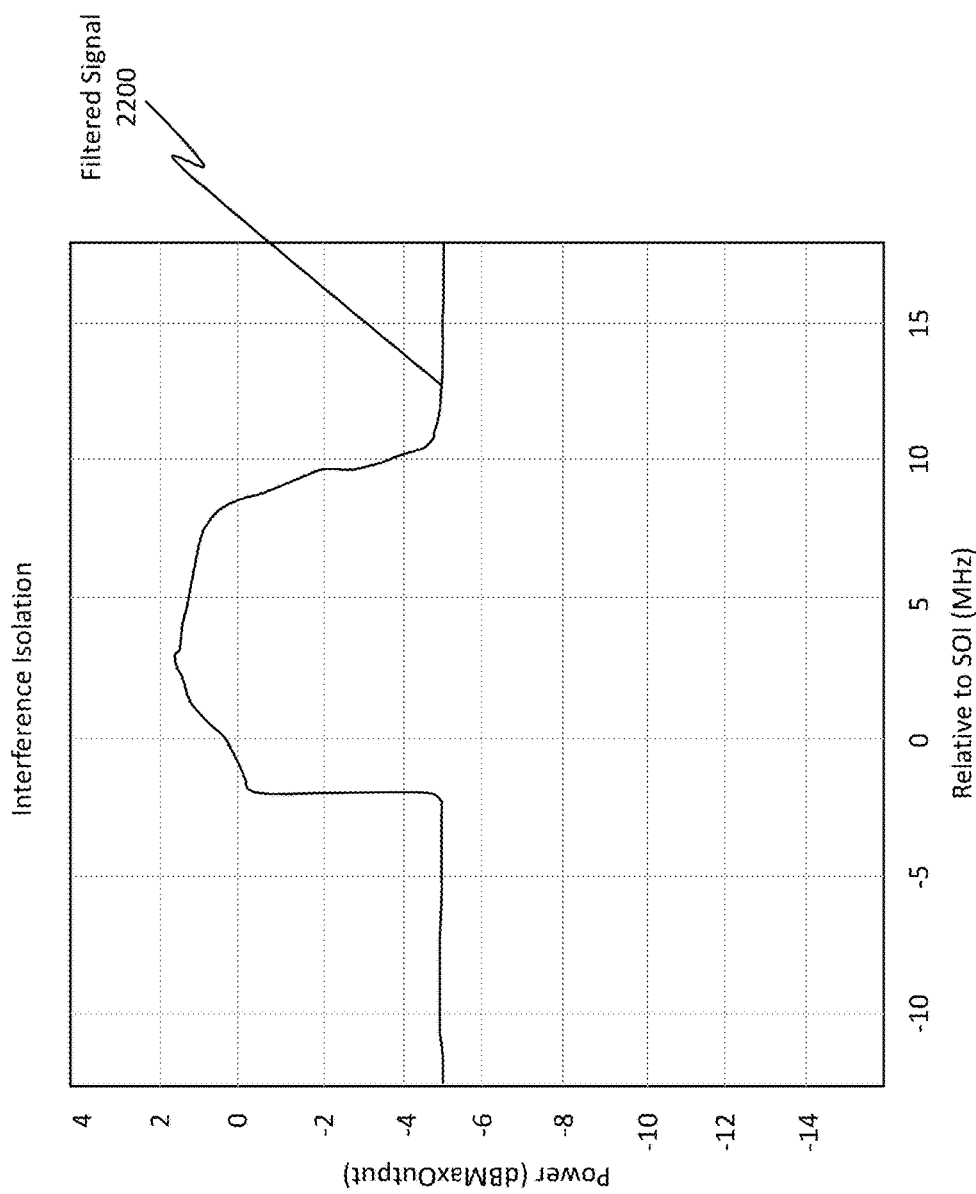
FIG. 22 illustrates an example graph of the filtered input signal.

FIG. 21 shows the input signal and a filter 2105, which is representative of the wide filter 2020. The filter 2105 is shown as having a filter width 2110. The filter width 2110 is selected to be the value of the coarse estimate of the jamming signal's symbol rate plus a wide buffer amount 2115. In some instance, the wide buffer amount 2115 is selected to be 5%, 10%, 15%, 20%, or even 25% larger than the coarse estimate of the symbol rate. In some cases, the wide buffer amount 2115 is selected to be larger than 25%. In any event, the filter 2105 is centered at the coarse estimate of the center frequency of the jamming signal and operates to filter the input signal 2100. FIG. 22 shows the resulting filtered signal 2200.

Returning to FIG. 20, the filtered signal 2200 from FIG. 22 is then fed as input into a detector circuit 2030. The detector circuit 2030 includes a non-linear operator 2035 that operates on the filtered signal. The non-linear operator 2035 is one of an $x^4$ operator, an $x^2$ operator, or a conjugate multiplier operator. By running the filtered signal through the non-linear operators, the embodiments are able to detect the modulation type 2035A of the input signal. The detected modulation type 2035A is also referred to as the data structure 2035B of the signal (i.e. the data structure of the input signal and jamming signal can be determined). The modulation type 2035A can be a BPSK type, a QPSK type, an offset QPSK, an 8PSK type, a tone type, a 16 QAM type, or even a CDMA type.

Figure 23:
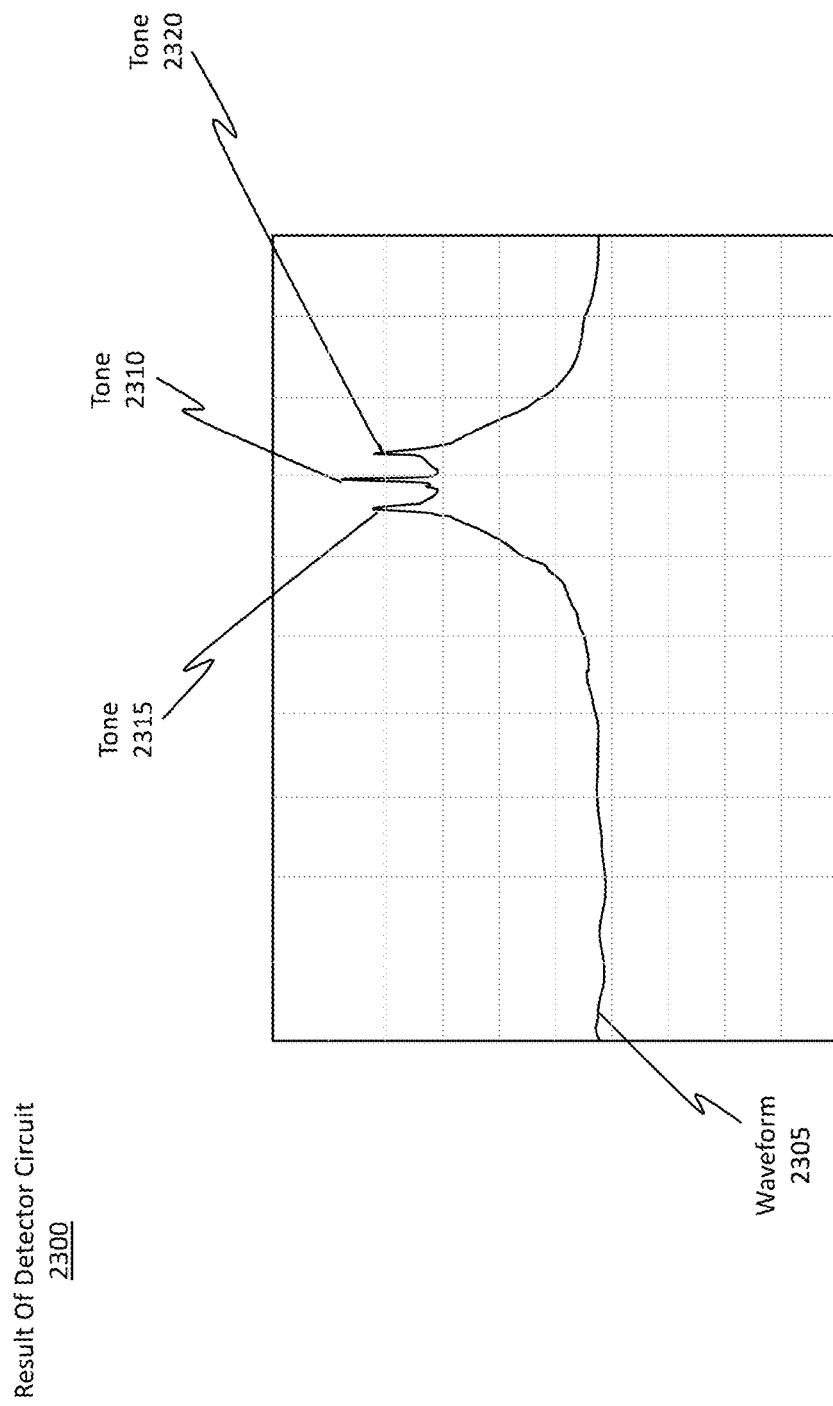
FIG. 23 illustrates a graph showing the filtered input signal after that signal was run through a non-linear operator.

To further clarify, a BPSK can be run through the $x^2$ operator, the $x^4$ operator, and the conjugate multiplier. The embodiments then analyze the resulting waveform to attempt to identify tones in the signal. The identification of tones enables identification of the modulation type of the signal. A QPSK, a 8PSK, and a tone signal (or any other type of modulated signal) can all also be run through the various different non-linear operators. Identification of tones in the resulting waveform enables identification of the modulation type. FIG. 23 is illustrative.

FIG. 23 shows the result of the detector circuit 2300. The result illustrates a waveform 2305 that was run through the $x^4$ non-linear operator. In this case, the filtered signal 2200 from FIG. 22 is a QPSK signal and was run through the $x^4$ non-linear operator. The waveform 2305 is the result of the $x^4$ operation. In this example case, the waveform 2305 includes a tone 2310, a tone 2315, and a tone 2320. Accordingly, the waveform 2305 is the output of the detector circuit 2030 in FIG. 20.

Figure 24:
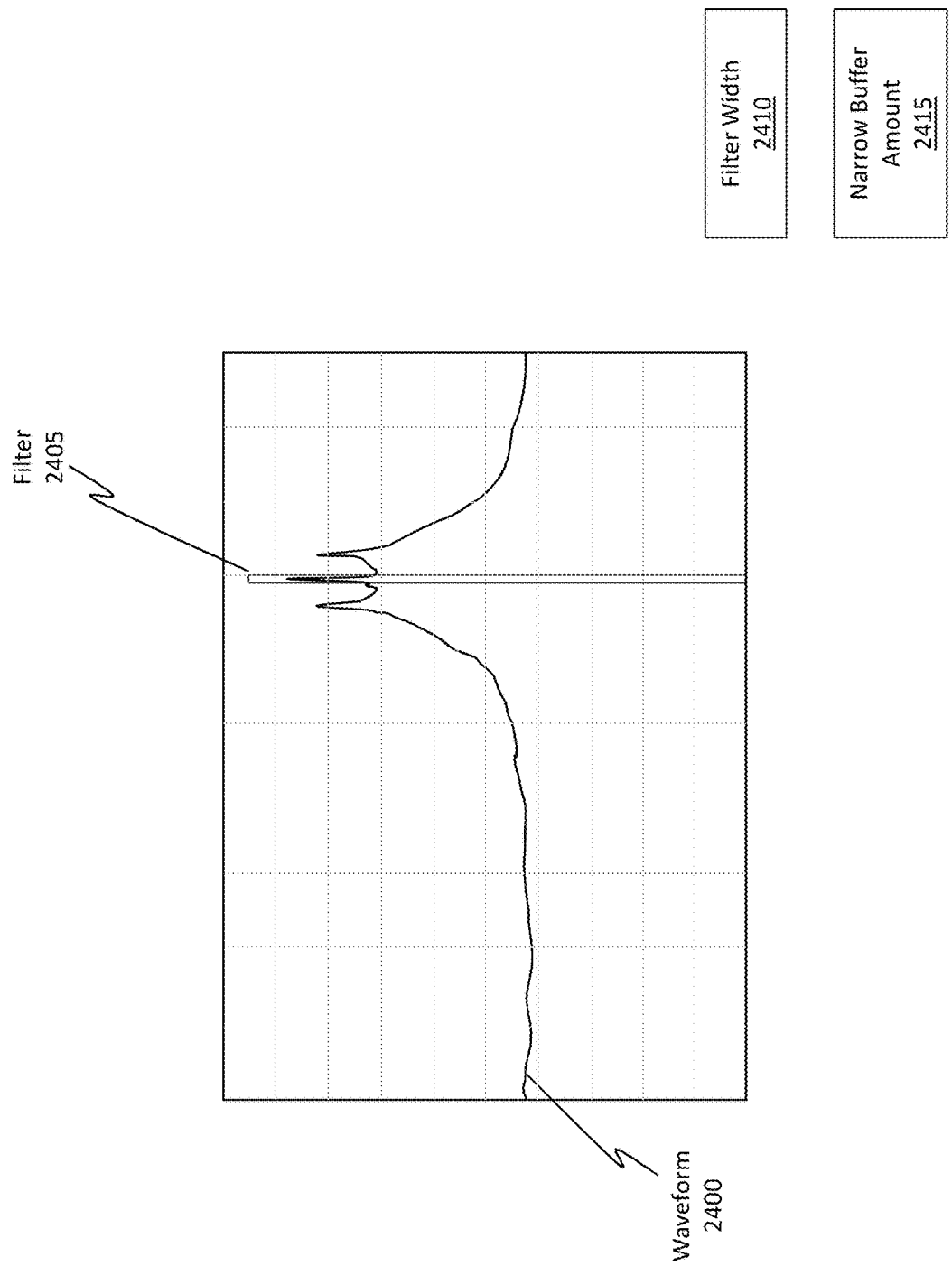
FIG. 24 shows the use of a narrow filter.

FIG. 20 then shows how the output of the detector circuit 2030 (i.e. the waveform 2305) is then fed as input into a narrow filter 2040, which may be a low pass down-sampling filter. FIG. 24 is illustrative.

Figure 25:
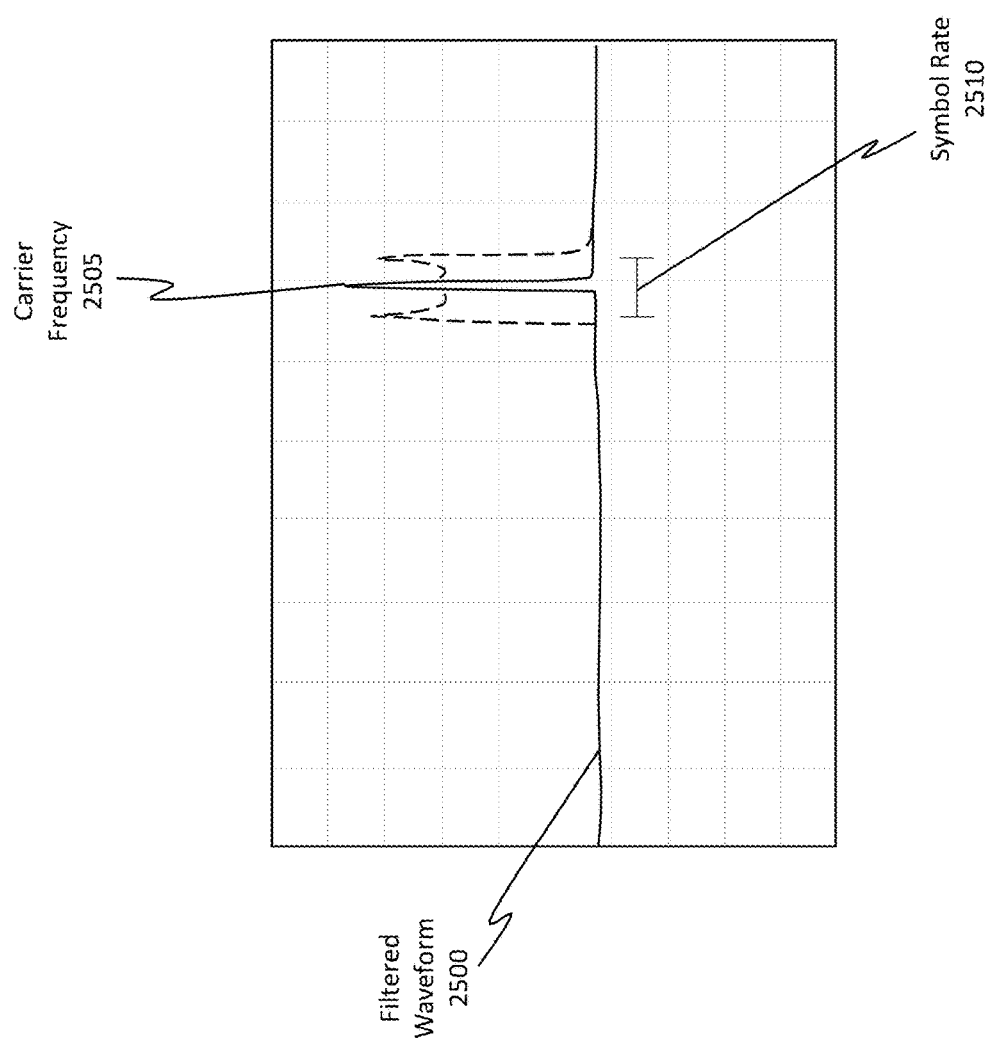
FIG. 25 shows the resulting waveform after the narrow filter has been executed.

FIG. 24 shows a waveform 2400, which is representative of the waveform 2305 from FIG. 23. The filter 2405 is representative of the narrow filter 2040. The filter 2405 is shown as having a filter width 2410, which is based on the location of the tone 2310 from FIG. 23 plus a narrow buffer amount 2415. The narrow buffer amount 2415 can be 5%, 10%, 15%, 20%, 25%, or more than 25% the width of the tone 2310. FIG. 25 shows the resulting filtered waveform 2500, with dashed lines representing the determined symbol rate. The central tone is generally representative of the jamming signal's carrier frequency 2505 and the width between the outer tones (i.e. the dashed lines) is generally representative of the jamming signal's symbol rate 2510.

In some cases, the symbol rate 2510 can be determined by identifying the tones that are produced as a result of using the operators described above (e.g., $x^2$ operator, $x^4$ operator, $x^8$ operator, etc.). Often, the symbol rate 2510 can be determined using a delay complex multiplier (e.g., a conjugate multiplier). For example, the signal can be delayed and then complexed multiplied. Performing such operations results in a signal with a central peak and perhaps multiple spikes on each side of the central peak. The symbol rate is then determined by analyzing the location of those side spikes or peaks. For example, the tones 2315 and 2320 from FIG. 23 can be considered as side peaks. Typically, the signal is symmetric. Based on that understanding, it is beneficial to fold the signal in half (e.g., at a vertical folding line) and then add the parts together. By adding the halves together, the spikes are then caused to grow to be twice their previous size. Data located in between the spikes can then be considered as noise and irrelevant data. The location of the spikes is then selected to be the symbol rate. In FIG. 25, the symbol rate 2510 is shown as being the width between the two side spikes that are dashed.

Returning to FIG. 20, the filtered waveform 2500 from FIG. 25 is then fed as input into an FFT 2045, which converts the waveform into the frequency domain. An averaging function 2050 is then applied to the frequency domain waveform in order to smooth out the waveform. That waveform is analyzed to identify the jamming signal's center or carrier frequency as well as the symbol rate, which are then selected to be the parameters 2055.

This first pass through the parameter estimator 2000 enables the embodiments to generate a set of medium granularity parameters 2060, which are closer or more accurate to the true values of the jamming signal's center frequency and symbol rate than that of the coarse granularity parameters 2005.

Returning to FIG. 18, method 1800 includes an act (act 1820) of refining the second set of estimation parameters to generate a third set of estimation parameters. This third set of estimation parameters provides a fine granularity estimate of the center frequency and the symbol rate of the jamming frequency. This third set can further include a modulation type of the jamming signal. The fine granularity estimate of the center frequency and the symbol rate is relatively closer to the actual values of the center frequency and the symbol rate than a relative closeness provided by the medium granularity estimate of the center frequency and the symbol rate. For instance, the fine granularity estimate of the symbol rate might be within about 500 Hz of the actual symbol rate. FIG. 19 provides additional details.

Specifically, FIG. 19 shows how the medium granularity parameters 1920 are generated via a first pass-through through the parameter estimator 1910. The medium granularity parameters 1920 are then fed as input to the parameter estimator 1925, which is the same as or is an instance of the parameter estimator 1910. The output of the parameter estimator 1925 is the fine granularity parameters 1930. FIG. 20 provides more detail.

Specifically, the medium granularity parameters 2060 are now available as input to the selector 2010. Whereas in the first run-through of the parameter estimator 2000, the coarse granularity parameters 2005 were selected by the selector 2010 to serve as the parameters 2015, now on this second pass-through, the selector 2010 selects the medium granularity parameters 2060 to operate as the parameters 2015. The same operations that were discussed earlier are performed again. Now, however, the wide buffer amount (e.g., wide buffer amount 2115) and the narrow buffer amount (e.g., narrow buffer amount 2415) are both selected to be smaller values than what were previously used and are selected based on the medium granularity parameters 2060.

After cycling or passing through the parameter estimator 2000 the second time, the embodiments determine whether the $2^{nd}$ pass has occurred. If so, then the fine granularity parameters 2065 have been generated. FIG. 19 shows that the fine granularity parameters 1930 are then fed as input into a removal component 1935 to produce the SOI 1940. Further details on these operations will be provided momentarily.

Accordingly, the process of refining the first set of estimation parameters to generate the second set of estimation parameters includes using the first set of estimation parameters to apply a wide filter to the input signal to generate a first filtered signal. A width of the wide filter is set to a value of the coarse granularity estimate of the symbol rate of the jamming signal plus a wide buffer amount. The wide filter is centered at the coarse granularity estimate of the center frequency of the jamming signal and filters signal content beyond the coarse granularity estimate of the symbol rate plus the wide buffer amount. A signal type of the first filtered input is one of a tone signal, a BPSK signal, a QPSK signal, an offset QPSK, an 8PSK signal, a 16 QAM signal, or even a CDMA signal.

The process also includes applying a non-linear operator to the first filtered signal to identify one or more tones in a resulting modified signal. A narrow filter is applied to the modified signal to generate a second filtered signal. A width of the narrow filter is set to a value of the coarse granularity estimate of the symbol rate of the jamming signal plus a narrow buffer amount. The narrow filter is centered at the coarse granularity estimate of the center frequency of the jamming signal. The process also includes applying a Fast Fourier Transform (FFT) to the second filtered signal to generate a frequency-domain signal. The process also includes applying an averaging function to the frequency-domain signal to smooth out the frequency-domain signal to reduce noise in the frequency-domain signal. The embodiments also identify, from within the averaged frequency-domain signal, a tone representative of the center frequency of the jamming signal and tones representative of the symbol rate of the jamming signal. The embodiments then set a frequency value of the tone representative of the center frequency and frequency values of the tones representative of the symbol rate as values forming the medium granularity estimate.

The process of refining the second set of estimation parameters to generate the third set of estimation parameters is similar to the process described above. Specifically, the process involves using the second set of estimation parameters to apply the same wide filter to the input signal to generate a third filtered signal. The width of the wide filter is set to a value of the medium granularity estimate of the symbol rate of the jamming signal plus a second wide buffer amount (e.g., perhaps between about 1-10% larger). The wide filter is centered at the medium granularity estimate of the center frequency of the jamming signal and filters signal content beyond the medium granularity estimate of the symbol rate plus the second wide buffer amount. The non-linear operator is applied to the third filtered signal to generate a second modified signal.

The same narrow filter is applied to the second modified signal to generate a fourth filtered signal. The width of the narrow filter is set to a value of the medium granularity estimate of the symbol rate of the jamming signal plus a second narrow buffer amount (e.g., perhaps between about 1-10% larger), and the narrow filter is centered at the medium granularity estimate of the center frequency of the jamming signal.

The Fast Fourier Transform (FFT) is applied to the fourth filtered signal to generate a second frequency-domain signal. The averaging function is applied to the second frequency-domain signal to smooth out the second frequency-domain signal to reduce noise in the second frequency-domain signal. The embodiments then identify, from within the averaged second frequency-domain signal, a fine granularity tone representative of the center frequency of the jamming signal and fine granularity tones representative of the symbol rate of the jamming signal. The embodiments also set a fine granularity frequency value of the fine granularity tone representative of the center frequency and fine granularity frequency values of the fine granularity tones representative of the symbol rate as values forming the fine granularity estimate.

Figure 26:
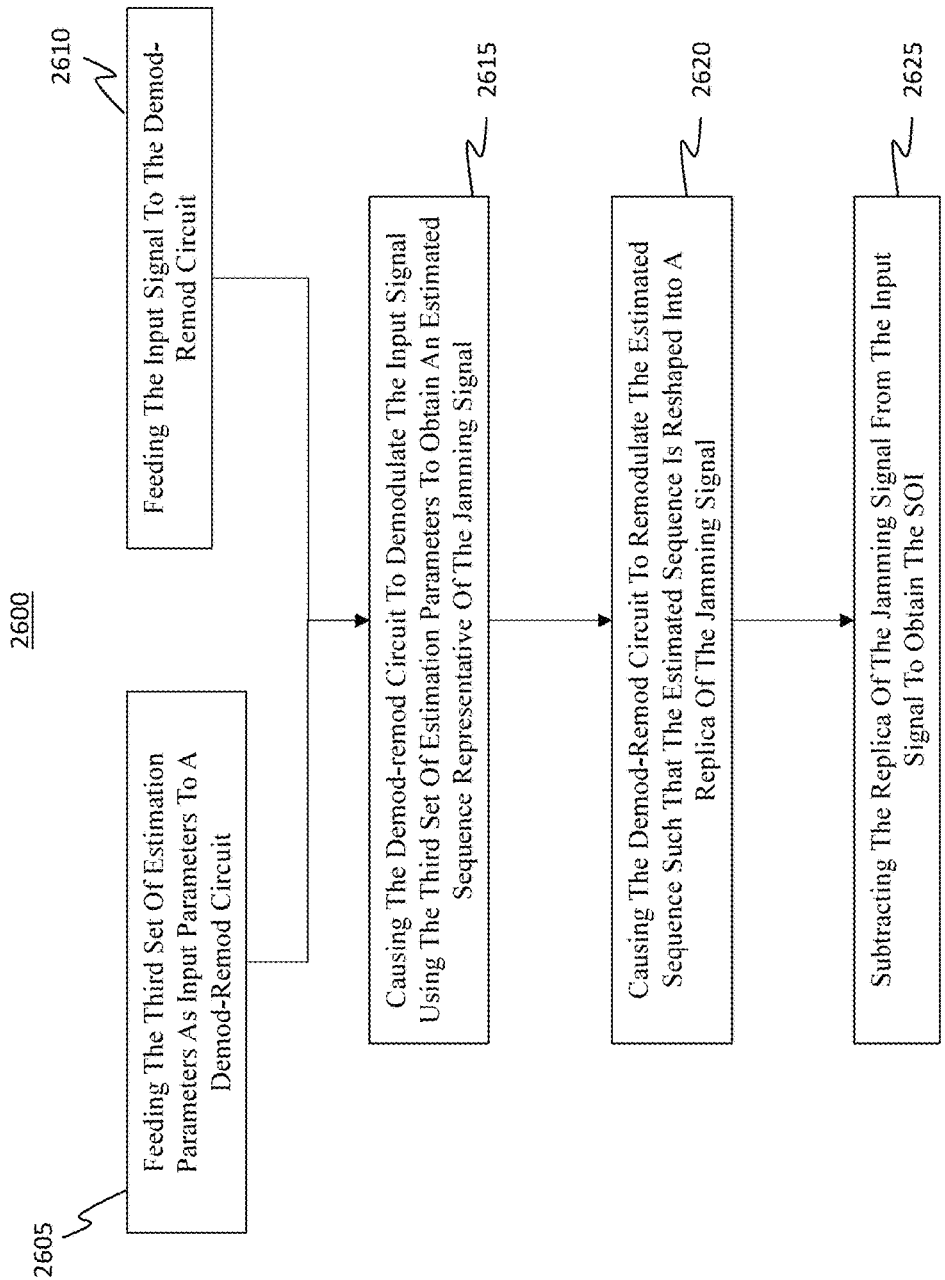
FIG. 26 describes an example process for using a demod-remod circuit to cancel out the effects of a jamming signal from an input signal.
Figure 27:
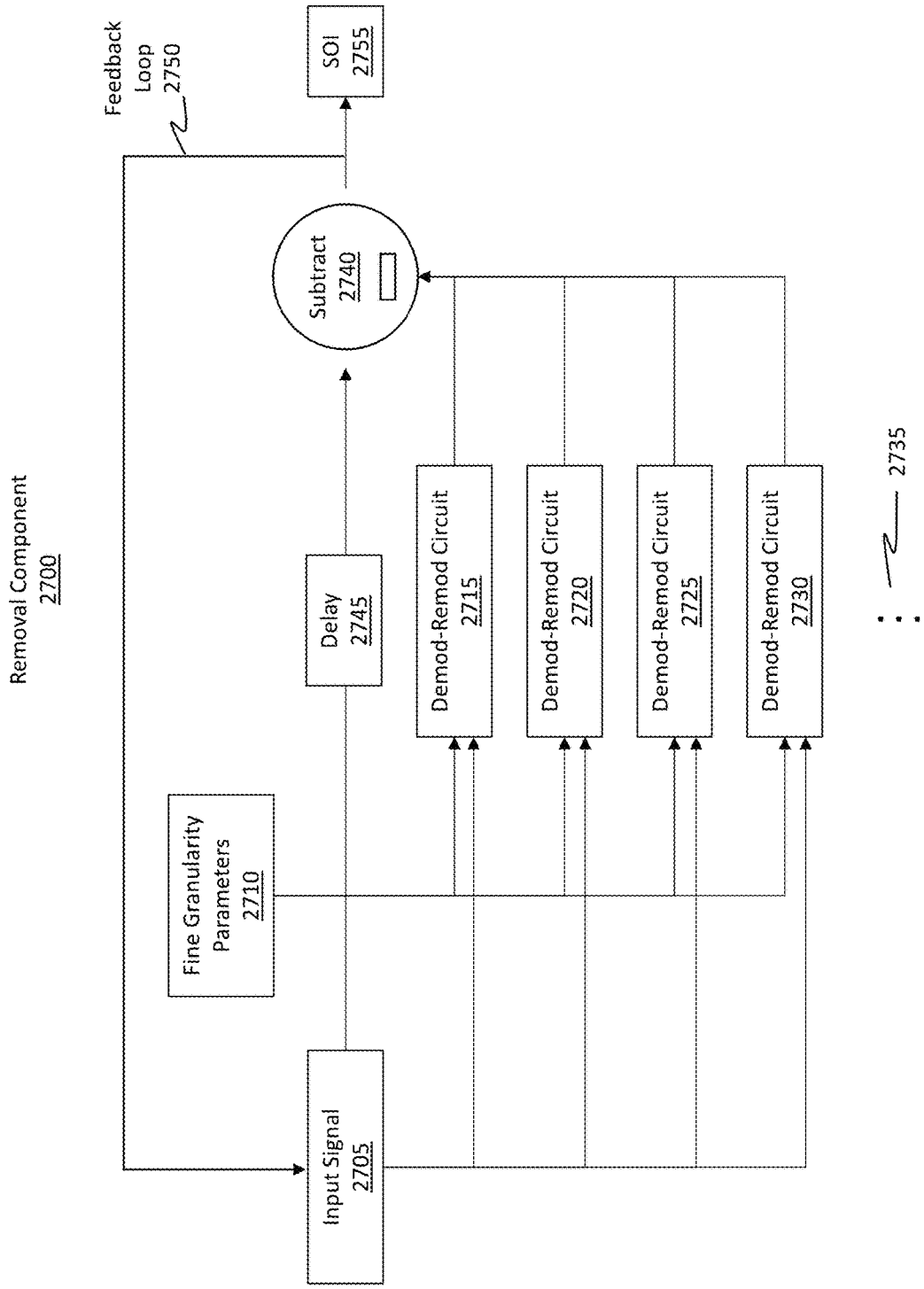
FIG. 27 shows an example architecture of a removal component.

Attention will now be returned to FIG. 18B. Specifically, after the third set of estimation parameters are generated, method 1800 includes an act (act 1825) of using the third set of estimation parameters to remove or reduce an influence of the jamming signal on the input signal such that the SOI is identified. Removing or reducing the influence of the jamming signal results in up to and potentially even beyond about a 25 dB reduction in signal strength of the jamming signal. The removal component 1935 from FIG. 19 performs such operations to produce the SOI 1940. FIGS. 26 and 27 provide additional detail regarding the removal operations.

FIG. 26 shows an example process 2600 for using the third set of estimation parameters (i.e. the fine granularity parameters mentioned earlier) to remove or reduce the influence of the jamming signal on the input signal such that the SOI is identified. Initially, process 2600 includes an act (act 2605) of feeding the third set of estimation parameters as input parameters to a demod-remod circuit (i.e. a demodulation-remodulation circuit). In parallel or in series with act 2605 is act 2610, which involves feeding the input signal to the demod-remod circuit.

Act 2615 then includes causing the demod-remod circuit to demodulate the input signal using the third set of estimation parameters to obtain an estimated sequence representative of the jamming signal. Subsequently, act 2620 includes causing the demod-remod circuit to remodulate the estimated sequence such that the estimated sequence is reshaped into a replica of the jamming signal. Finally, act 2625 includes subtracting the replica of the jamming signal from the input signal to obtain the SOI. FIG. 27 provides a helpful illustration of this process.

FIG. 27 shows an example architecture of a removal component 2700, which is representative of the removal component 1935 from FIG. 19 and which is configured to perform act 1825 described earlier. An input signal 2705, which is representative of the input signals mentioned throughout this disclosure, and a set of fine granularity parameters 2710, which are representative of those mentioned throughout, are fed as input into one or more demod-remod circuits, such as demod-remod circuits 2715, 2720, 2725, and 2730. The ellipsis 2735 shows how any number of demod-remod circuits may be used. Accordingly, removing or reducing the influence of the jamming signal on the input signal includes use of one or more demod-remod circuits. Inasmuch as demod-remod circuits are generally known in the art, a specific description of their architectures and operations will not be provided herein. Notably, a number of demod-remod circuits that are used may be dependent on a number of jamming signals that are included in the composite signal. Further details will be provided momentarily.

Often, the jamming signal with the highest power is operated on first. In some cases, once the highest powered jamming signal is removed, then the next highest powered jamming signal is operated on and is removed, and so on and so forth.

An input signal, which is a composite signal comprising a SOI and a jamming signal, may actually include more than one jamming signal. Indeed, the composite signal may include 1, 2, 3, 4, 5, 6, 7, 8, 9, 10, or more than 10 jamming signals. The number of demod-remod circuits that are employed or activated is based on the number of jamming signals. As will be described in more detail later, a feedback look is provided in the removal component 2700 to enable the elimination of multiple different jamming signals.

In any event, a demod-remod circuit receives the input signal 2705 and the fine granularity parameters 2710. The circuit demodulates the input signal using the fine granularity parameters 2710 to obtain an estimated sequence that is representative of the jamming signal. The circuit then remodulates the estimated sequence in a manner so that it is reshaped into a replica of the jamming signal. The removal component 2700 then subtracts (as shown by subtract 2740) the replica of the jamming signal from a delayed version (as shown by delay 2745) of the input signal 2705 to thereby remove, eliminate, or at least reduce an impact of the jamming signal from the input signal 2705 to produce the SOI 2755. The removal component 2700 includes a feedback loop 2750 to enable multiple iterations in the event that multiple jamming signals are present in the input signal 2705.

By following the disclosed operations, the embodiments are beneficially able to remove or reduce the impact of a jamming signal on a SOI. Such operations can be performed essentially in real-time and can be performed to remove multiple jamming signals. The disclosed embodiments are highly efficient and less compute-intensive than traditional systems.

Accordingly, the disclosed embodiments describe a multi-stage process for iteratively inferring or estimating parameters of a jamming signal. These parameters are then used by a demod-remod circuit in order to lock on to the jamming signal and to enable that jamming signal to be removed or subtracted from the input signal to produce the SOI. In some cases, the phase locked loops of the demod-remod circuits might temporarily lose the lock on the signal. In such cases, the system can re-lock onto the input signal as a result of performing continuous or near-continuous monitoring of the input signal. Therefore, even if the input signal is lost for a brief period of time, the embodiments are able to re-lock onto the signal by continuously (e.g., in real-time or near real-time) monitoring the signal.

Example Computer/Computer Systems

Figure 28:
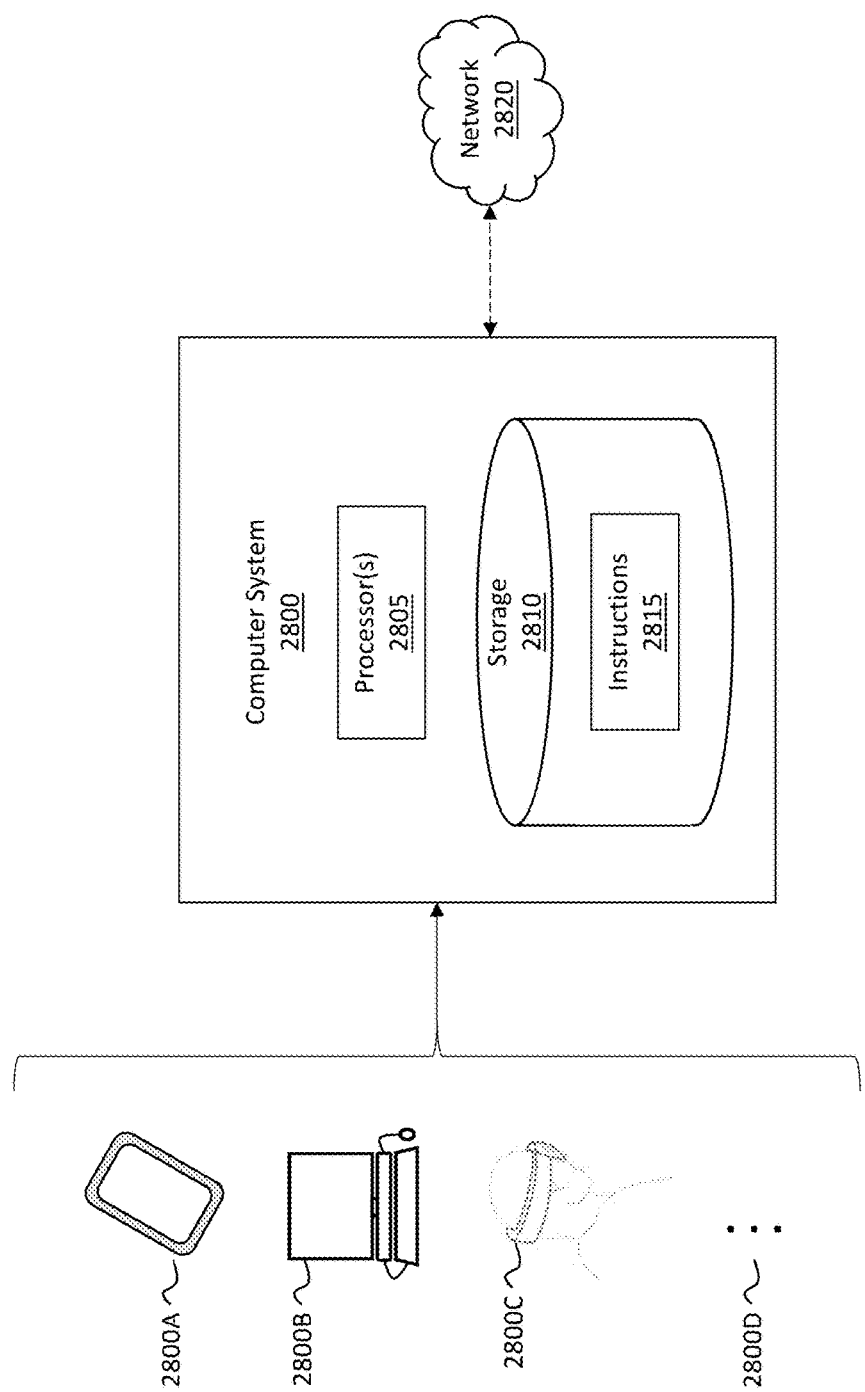
FIG. 28 illustrates an example computer system configured to perform any of the disclosed operations.

Attention will now be directed to FIG. 28 which illustrates an example computer system 28 that may include and/or be used to perform any of the operations described herein. To further clarify, the computer system 2800 can be configured to perform the operations discussed in the various figures and methods. Computer system 2800 may take various different forms. For example, computer system 2800 may be embodied as a tablet 2800A, a desktop or laptop 2800B, a wearable device 2800C, a mobile device, or a standalone device. The ellipsis 2800D shows how any configuration may be used. Computer system 2800 may also be a distributed system that includes one or more connected computing components/devices that are in communication with computer system 2800.

In its most basic configuration, computer system 2800 includes various different components. FIG. 28 shows that computer system 2800 includes one or more processor(s) 2805 (aka a "hardware processing unit") and storage 2810.

Regarding the processor(s) 2805, it will be appreciated that the functionality described herein can be performed, at least in part, by one or more hardware logic components (e.g., the processor(s) 2805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, terms such as "executable module," "executable component," "component," "module," "engine", or perhaps even "circuit" can refer to hardware processing units or to software objects, routines, or methods that may be executed on computer system 2800. The different components, modules, engines, and services described herein may be implemented as objects or processors that execute on computer system 2800 (e.g. as separate threads).

Storage 2810 may be physical system memory, which may be volatile, non-volatile, or some combination of the two. The term "memory" may also be used herein to refer to non-volatile mass storage such as physical storage media. If computer system 2800 is distributed, the processing, memory, and/or storage capability may be distributed as well.

Storage 2810 is shown as including executable instructions 2815. The executable instructions 2815 represent instructions that are executable by the processor(s) 2805 of computer system 2800 to perform the disclosed operations, such as those described in the various methods.

The disclosed embodiments may comprise or utilize a special-purpose or general-purpose computer including computer hardware, such as, for example, one or more processors (such as processor(s) 2805) and system memory (such as storage 2810), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2800 may also be connected (via a wired or wireless connection) to external sensors (e.g., one or more remote cameras) or devices via a network 2820. For example, computer system 2800 can communicate with any number devices or cloud services to obtain or process data. In some cases, network 2820 may itself be a cloud network. Furthermore, computer system 2800 may also be connected through one or more wired or wireless networks 2820 to remote/separate computer systems(s) that are configured to perform any of the processing described with regard to computer system 2800.

A "network," like network 2820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2800 will include one or more communication channels that are used to communicate with the network 2820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing a multi-stage iterative scheme to determine fine granularity estimates of parameters of an interfering signal and for using the fine granularity estimates of the parameters to reduce an impact of the interfering signal against a signal of interest (SOI), said method comprising:

identifying an input signal that is suspected of being a jammed composite signal comprising a combination of the signal of interest (SOI) and a jamming signal;

determining a first set of estimation parameters that provides a coarse granularity estimate of a center frequency of the jamming signal and of a symbol rate of the jamming signal;

refining the first set of the estimation parameters to generate a second set of the estimation parameters that provide a medium granularity estimate of the center frequency and the symbol rate of the jamming signal, wherein the medium granularity estimate of the center frequency and the symbol rate is relatively closer to actual values of the center frequency and the symbol rate than a first relative closeness provided by the coarse granularity estimate of the center frequency and the symbol rate;

refining the second set of the estimation parameters to generate a third set of the estimation parameters that provide a fine granularity estimate of the center frequency and the symbol rate of the jamming signal, wherein the fine granularity estimate of the center frequency and the symbol rate is relatively closer to the actual values of the center frequency and the symbol rate than a second relative closeness provided by the medium granularity estimate of the center frequency and the symbol rate; and after the third set of the estimation parameters are generated, using the third set of the estimation parameters to remove or reduce an influence of the jamming signal on the input signal such that the SOI is identified.

2. The method of claim 1, wherein the third set of estimation parameters further includes a modulation type of the jamming signal.

3. The method of claim 2, wherein using the third set of estimation parameters to remove or reduce the influence of the jamming signal on the input signal includes:

feeding the third set of estimation parameters as input parameters to a demod-remod circuit;

feeding the input signal to the demod-remod circuit;

causing the demod-remod circuit to demodulate the input signal using the third set of estimation parameters to obtain an estimated sequence representative of the jamming signal;

causing the demod-remod circuit to remodulate the estimated sequence such that the estimated sequence is reshaped into a replica of the jamming signal; and subtracting the replica of the jamming signal from the input signal to obtain the SOI.

4. The method of claim 1, wherein refining the first set of estimation parameters to generate the second set of estimation parameters includes:

using the first set of estimation parameters to apply a wide filter to the input signal to generate a first filtered signal, wherein a width of the wide filter is set to a value of the coarse granularity estimate of the symbol rate of the jamming signal plus a wide buffer amount, and wherein the wide filter is centered at the coarse granularity estimate of the center frequency of the jamming signal and filters signal content beyond the coarse granularity estimate of the symbol rate plus the wide buffer amount;

applying a non-linear operator to the first filtered signal to identify one or more tones in a resulting modified signal;

applying a narrow filter to the modified signal to generate a second filtered signal, wherein a width of the narrow filter is set to a value of the coarse granularity estimate of the symbol rate of the jamming signal plus a narrow buffer amount, and wherein the narrow filter is centered at the coarse granularity estimate of the center frequency of the jamming signal;

applying a Fast Fourier Transform (FFT) to the second filtered signal to generate a frequency-domain signal;

applying an averaging function to the frequency-domain signal to smooth out the frequency-domain signal to reduce noise in the frequency-domain signal;

identifying, from within the averaged frequency-domain signal, a tone representative of the center frequency of the jamming signal and tones representative of the symbol rate of the jamming signal; and setting a frequency value of the tone representative of the center frequency and frequency values of the tones representative of the symbol rate as values forming the medium granularity estimate.

5. The method of claim 4, wherein the non-linear operator is one of an $X^4$ operator, an $X^2$ operator, or a conjugate multiplier operator.

6. The method of claim 4, wherein a signal type of the first filtered input is one of a BPSK signal, a QPSK signal, an offset QPSK signal, a 8PSK signal, a tone signal, a 16 QAM signal, or a CDMA signal.

7. The method of claim 4, wherein refining the second set of estimation parameters to generate the third set of estimation parameters includes:

using the second set of estimation parameters to apply the same wide filter to the input signal to generate a third filtered signal, wherein the width of the wide filter is set to a value of the medium granularity estimate of the symbol rate of the jamming signal plus a second wide buffer amount, and wherein the wide filter is centered at the medium granularity estimate of the center frequency of the jamming signal and filters signal content beyond the medium granularity estimate of the symbol rate plus the second wide buffer amount;

applying the non-linear operator to the third filtered signal to generate a second modified signal;

applying the same narrow filter to the second modified signal to generate a fourth filtered signal, wherein the width of the narrow filter is set to a value of the medium granularity estimate of the symbol rate of the jamming signal plus a second narrow buffer amount, and wherein the narrow filter is centered at the medium granularity estimate of the center frequency of the jamming signal;

applying the Fast Fourier Transform (FFT) to the fourth filtered signal to generate a second frequency-domain signal;

applying the averaging function to the second frequency-domain signal to smooth out the second frequency-domain signal to reduce noise in the second frequency-domain signal;

identifying, from within the averaged second frequency-domain signal, a fine granularity tone representative of the center frequency of the jamming signal and fine granularity tones representative of the symbol rate of the jamming signal; and setting a fine granularity frequency value of the fine granularity tone representative of the center frequency and fine granularity frequency values of the fine granularity tones representative of the symbol rate as values forming the fine granularity estimate.

8. The method of claim 1, wherein the composite signal includes the SOI, the jamming signal, and one or more additional jamming signals.

9. The method of claim 1, wherein a data structure of the jamming signal is determined.

10. The method of claim 1, wherein removing or reducing the influence of the jamming signal results in about a 25 dB reduction to a signal strength of the jamming signal.

11. A computer system configured to provide a multi-stage iterative scheme to determine fine granularity estimates of parameters of an interfering signal and to use the fine granularity estimates of the parameters to reduce an impact of the interfering signal against a signal of interest (SOI), said computer system comprising:
one or more processors; and
one or more computer-readable hardware storage devices that store instructions that are executable by the one or more processors to cause the computer system to at least:
identify an input signal that is suspected of being a jammed composite signal comprising a combination of the signal of interest (SOI) and a jamming signal;
determine a first set of estimation parameters that provides a coarse granularity estimate of a center frequency of the jamming signal and of a symbol rate of the jamming signal;
refine the first set of the estimation parameters to generate a second set of the estimation parameters that provide a medium granularity estimate of the center frequency and the symbol rate of the jamming signal, wherein the medium granularity estimate of the center frequency and the symbol rate is relatively closer to actual values of the center frequency and the symbol rate than a first relative closeness provided by the coarse granularity estimate of the center frequency and the symbol rate;
refine the second set of the estimation parameters to generate a third set of the estimation parameters that provide a fine granularity estimate of the center frequency and the symbol rate of the jamming signal, wherein the fine granularity estimate of the center frequency and the symbol rate is relatively closer to the actual values of the center frequency and the symbol rate than a second relative closeness provided by the medium granularity estimate of the center frequency and the symbol rate; and
after the third set of the estimation parameters are generated, using the third set of the estimation parameters to remove or reduce an influence of the jamming signal on the input signal such that the SOI is identified.

12. The computer system of claim 11, wherein 4 jamming signals are included in the composite signal.

13. The computer system of claim 11, wherein removing or reducing the influence of the jamming signal on the input signal includes use of one or more demod-remod circuits.

14. The computer system of claim 13, wherein a number of demod-remod circuits that are used is dependent on a number of jamming signals that are included in the composite signal.

15. The computer system of claim 11, wherein the jamming signal is one jamming signal included in a plurality of jamming signals that are included in the composite signal, and wherein the jamming signal is a highest power jamming signal.

16. The computer system of claim 11, wherein refining the first set of estimation parameters involves use of a first low pass down-sampling filter and a second low pass down-sampling filter.

17. The computer system of claim 16, wherein refining the first set of estimation parameters involves use of a non-linear operator.

18. The computer system of claim 17, wherein refining the first set of estimation parameters further involves use of a Fast Fourier Transform (FFT) and an averaging function.

19. A computer system configured to provide a multi-stage iterative scheme to determine fine granularity estimates of parameters of an interfering signal and to use the fine granularity estimates of the parameters to reduce an impact of the interfering signal against a signal of interest (SOI), said computer system comprising:
one or more processors; and
one or more computer-readable hardware storage devices that store instructions that are executable by the one or more processors to cause the computer system to at least:
identify an input signal that is suspected of being a jammed composite signal comprising a combination of the signal of interest (SOI) and a jamming signal;
determine a first set of estimation parameters that provide a coarse granularity estimate of a center frequency of the jamming signal and of a symbol rate of the jamming signal;
refine the first set of the estimation parameters to generate a second set of the estimation parameters that provide a medium granularity estimate of the center frequency and the symbol rate of the jamming signal, wherein the medium granularity estimate of the center frequency and the symbol rate is relatively closer to actual values of the center frequency and the symbol rate than a first relative closeness provided by the coarse granularity estimate of the center frequency and the symbol rate;
refine the second set of the estimation parameters to generate a third set of the estimation parameters that provide a fine granularity estimate of the center frequency and the symbol rate of the jamming signal, wherein the fine granularity estimate of the center frequency and the symbol rate is relatively closer to the actual values of the center frequency and the symbol rate than a second relative closeness provided by the medium granularity estimate of the center frequency and the symbol rate; and
after the third set of the estimation parameters are generated, using the third set of the estimation parameters to remove or reduce an influence of the jamming signal on the input signal such that the SOI is identified, wherein removing or reducing the influence of the jamming signal is performed using a demod-remod circuit.

20. The computer system of claim 19, wherein the demod-remod circuit demodulates the input signal using the third set of estimation parameters to obtain an estimated sequence representative of the jamming signal and then remodulates the estimated sequence such that the estimated sequence is reshaped into a replica of the jamming signal, and
wherein the replica of the jamming signal is subtracted from the input signal to obtain the SOI.

* * * * *